(12) United States Patent
Mao et al.

(10) Patent No.: US 12,489,698 B2
(45) Date of Patent: Dec. 2, 2025

(54) PACKET ENCODING AND ALLOCATION IN MULTI-LINK SYSTEMS

(71) Applicant: Intel Corporation, Santa Clara, CA (US)

(72) Inventors: Wei Mao, San Jose, CA (US); Hosein Nikopour, San Jose, CA (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 838 days.

(21) Appl. No.: 17/553,845

(22) Filed: Dec. 17, 2021

(65) Prior Publication Data

US 2023/0198879 A1    Jun. 22, 2023

(51) Int. Cl.
*H04L 43/0823*  (2022.01)
*H04L 43/0829*  (2022.01)
*H04W 24/06*  (2009.01)

(52) U.S. Cl.
CPC ...... *H04L 43/0847* (2013.01); *H04L 43/0829* (2013.01); *H04W 24/06* (2013.01)

(58) Field of Classification Search
CPC . H04L 43/0847; H04L 43/0829; H04W 24/06
See application file for complete search history.

(56) References Cited

U.S. PATENT DOCUMENTS

| | | | | |
|---|---|---|---|---|
| 5,062,104 A * | 10/1991 | Lubarsky | ................ | H04L 12/52 714/752 |
| 6,091,933 A * | 7/2000 | Sherman | ............ | H04B 7/18543 455/13.1 |
| 6,691,260 B1 * | 2/2004 | Ueno | ............... | G11B 20/10009 714/48 |
| 8,483,223 B2 * | 7/2013 | Black | ................... | H04L 1/1607 370/394 |
| 9,722,842 B2 * | 8/2017 | Agee | ...................... | H04W 72/23 |
| 10,484,925 B1 * | 11/2019 | Chen | ..................... | H04W 40/16 |

(Continued)

OTHER PUBLICATIONS

Zarifneshat et al., "Learning-based blockage prediction for roubst links in dyunamic millimeter wave networks", Aug. 27, 2021, Springer Nature 2021.*

(Continued)

*Primary Examiner* — Todd L Barker
(74) *Attorney, Agent, or Firm* — Viering, Jentschura & Partner mbB

(57) ABSTRACT

A system for wireless communication, the system may include a processor configured to generate encoded packets representative of input packets. The processor may also be configured to determine a probability of a transmission error for each link of a plurality of links. In addition, the processor may be configured to determine a probability of a link blockage error for each link of the plurality of links. Further, the processor may be configured to determine an allocation scheme for the encoded packets on the plurality of links based on the probability of the transmission error and the probability of the link blockage error for each link of the plurality of links. The processor may be configured to allocate the encoded packets on the plurality of links according to the allocation scheme. The processor may also be configured to instruct to wirelessly transmit the encoded packets on the plurality of links.

20 Claims, 6 Drawing Sheets

(56) References Cited

U.S. PATENT DOCUMENTS

| | | | | |
|---|---|---|---|---|
| 10,652,782 | B1* | 5/2020 | Korpi | H04L 1/1825 |
| 12,075,266 | B2* | 8/2024 | Makki | H04W 24/04 |
| 2004/0057394 | A1* | 3/2004 | Holtzman | H04L 1/0033 |
| | | | | 370/235 |
| 2005/0118958 | A1* | 6/2005 | Alexiou | H04L 1/203 |
| | | | | 375/267 |
| 2011/0296280 | A1* | 12/2011 | Achir | H04L 1/0057 |
| | | | | 714/776 |
| 2013/0166764 | A1* | 6/2013 | Boldt | H04L 67/02 |
| | | | | 709/230 |
| 2017/0310572 | A1* | 10/2017 | Yi | H04L 43/0823 |
| 2020/0120510 | A1* | 4/2020 | Gresset | B61L 27/70 |
| 2021/0329728 | A1* | 10/2021 | Won | G06N 20/00 |
| 2021/0400504 | A1* | 12/2021 | Makki | H04W 24/04 |
| 2022/0078099 | A1* | 3/2022 | Zhohov | H04W 24/08 |
| 2022/0139209 | A1* | 5/2022 | Biala | G08G 1/0137 |
| | | | | 701/1 |
| 2022/0369201 | A1* | 11/2022 | Makki | H04W 40/22 |
| 2022/0407926 | A1* | 12/2022 | Mujeeb | G06F 21/64 |
| 2023/0039254 | A1* | 2/2023 | Raghavan | G06N 3/044 |
| 2023/0123472 | A1* | 4/2023 | Alkhateeb | G06N 3/08 |
| | | | | 375/262 |
| 2025/0048413 | A1* | 2/2025 | Son | H04W 72/20 |
| 2025/0063451 | A1* | 2/2025 | Kompalli Chakravartula | |
| | | | | H04W 28/0942 |

OTHER PUBLICATIONS

Zhang et al., "RL-based Resource Allocation in mmWave 5G IAB networks", 2020 Mediterannean Communication and Computer Networking Conference.*

Chari et al., "Link Blockage Modelling for Channel State Prediction in Higher Frequencies Using Deep Learning", Jul. 2021, 2021 10th iInternational Conference on Modern Circuits and Systems Tedhnologies.*

Margarita Gapeyenko et al., "On the Temporal Effects of Mobile Blockers in Urban Millimeter-Wave Cellular Scenarios", IEEE Transactions on Vehicular Technology, May 15, 2017, 13 pages, vol. 66, No. 11, IEEE.

* cited by examiner

PACKET ENCODING AND ALLOCATION IN MULTI-LINK SYSTEMS

FIELD

The embodiments discussed in the present disclosure are related to packet encoding and allocation in multi-link systems.

BACKGROUND

Unless otherwise indicated in the present disclosure, the materials described in the present disclosure are not prior art to the claims in the present application and are not admitted to be prior art by inclusion in this section.

A wireless communication system may include a device that includes a transceiver that is configured to wirelessly transmit encoded packets using multiple links. For example, the transceiver may be configured to wirelessly transmit the encoded packets using multiple cells, multiple access points, multi-connectivity, multi-RAT, multiple carriers (e.g., carrier aggregation), or some combination thereof.

The subject matter claimed in the present disclosure is not limited to aspects that solve any disadvantages or that operate only in environments such as those described above. Rather, this background is only provided to illustrate one example technology area where some aspects described in the present disclosure may be practiced.

BRIEF DESCRIPTION OF THE DRAWINGS

Example aspects will be described and explained with additional specificity and detail through the use of the accompanying drawings in which.

DETAILED DESCRIPTION

Figure 1:
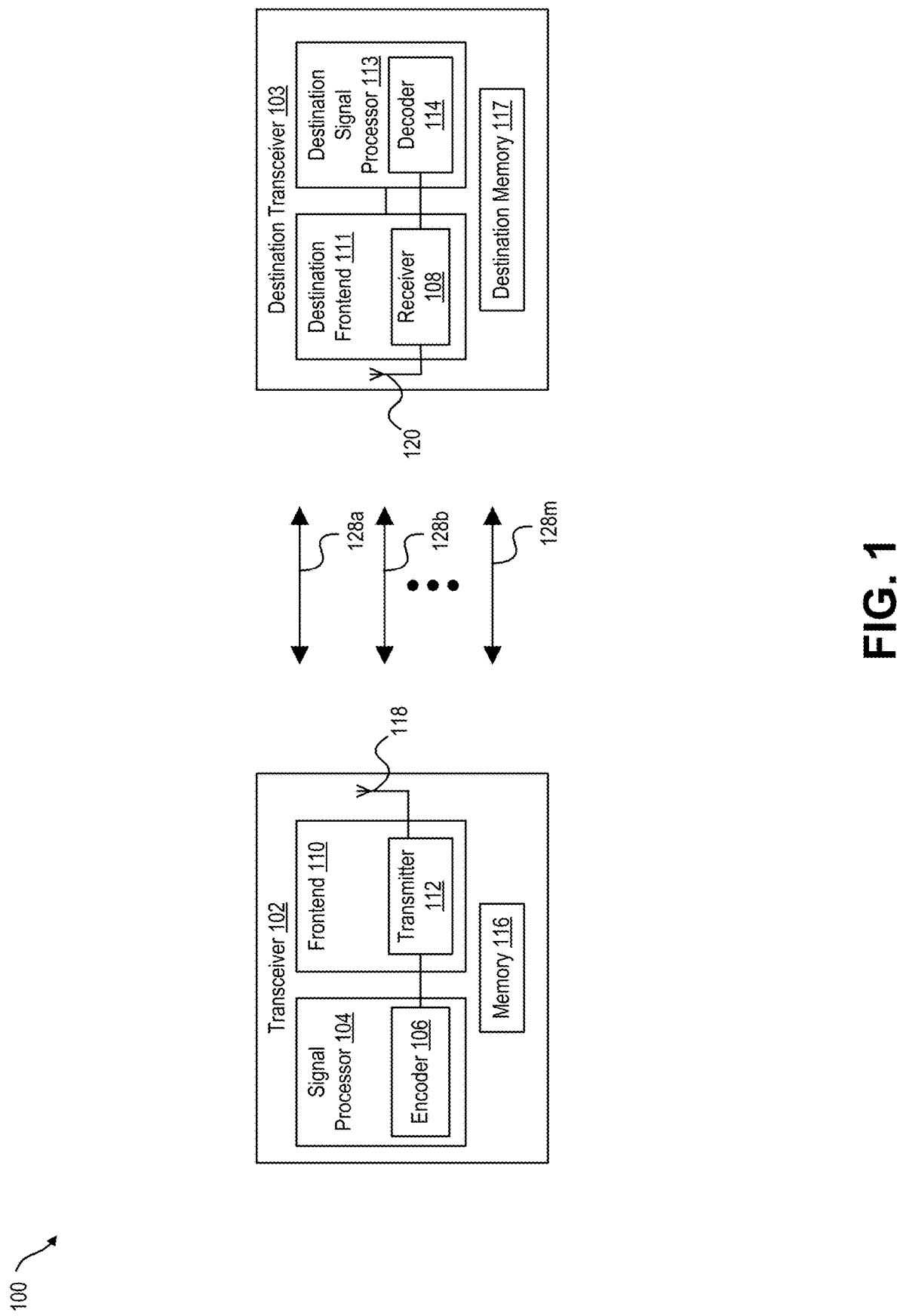
FIG. 1 illustrates a block diagram of an example operational environment to wirelessly transmit encoded packets on multiple links.

A wireless communication system may include a device (e.g., a source device) that includes a transceiver (e.g., a transceiver system) that is configured to wirelessly transmit encoded packets using multiple links. For example, the transceiver may be configured to wirelessly transmit the encoded packets using multiple cells, multiple access points, multi-connectivity, multi-RAT, multiple carriers (e.g., carrier aggregation), or some combination thereof. The transceiver may wirelessly transmit the encoded packets using the links to a destination transceiver (e.g., a destination transceiver system) of a destination device that is communicatively coupled to the transceiver.

The transceiver may obtain input packets that are representative of information to be wirelessly transmitted by the destination transceiver. Each of the input packets $[P_1, P_2, \ldots, P_k]$ may be the same or similarly sized (e.g., may include the same or similar amount of information). For linear encoding, the input packets may be represented as column vectors over a Galois field.

The transceiver may encode the input packets to generate the encoded packets. The transceiver may encode the input packets using encoding vectors that include multiple coefficients. The encoded packets may be represented in accordance with Equation 1.

$$\sum_{i=1}^{k} c_i \cdot P_i \qquad \text{Equation 1}$$

In Equation 1, i may represent a packet index, c may represent a current coefficient from a corresponding encoding vector, P may represent a current input packet, and k may represent a minimum size of a subset of the encoded packets for the destination transceiver to recover the input packets (referred to in the present disclosure as the "minimum subset size"). The transceiver may use a Reed-Solomon code, a maximum distance separable code, or some combination thereof to encode the input packets. The transceiver may generate the encoded packets based on a reliability setting, a resiliency setting, or some combination thereof associated with the input packets.

The transceiver may generate the number of encoded packets in accordance with Equation 2.

$$\sum_{i=1}^{m} x_i \qquad \text{Equation 2}$$

In Equation 2, i may represent a link index, x may represent a number of the encoded packets allocated on a current link, and m may represent a coefficient corresponding to the number of links.

The transceiver may wirelessly transmit the encoded packets to the destination transceiver using the links. For example, the transceiver may wirelessly transmit a first encoded packet on a first link and a second encoded packet on a second link.

The destination transceiver may decode the wirelessly transmitted encoded packets. The destination transceiver may recover the input packets, if the minimum subset is received (e.g., the k number of encoded packets) by the destination transceiver. The destination transceiver may recover the input packets using Equation 3.

$$[R_1, R_2, \ldots R_k]M^{-1} \qquad \text{Equation 3}$$

In Equation 3, R may represent a current encoded packet and M may represent a table of coefficients of which an $i^{th}$ column includes a corresponding encoding vector.

Transmission errors (e.g., sporadic errors), link blockage errors, or some combination thereof (generally referred to in the present disclosure as "errors") may occur on one or more of the links during wireless transmission. The errors may cause packet loss, which may impact reliability and resiliency of the links. The transmission errors may be characterized as independent and identically distributed packet loss across the links and of different encoded packets. Encoding of the input packets may improve reliability, resiliency, or some combination of wireless transmission of the encoded packets to the errors.

The link blockage errors may be modeled as a Poisson arrival process. A probability of the link blockage errors may be determined according to Equation 4.

$$1 - e^{-\lambda_i T_i} \quad \text{Equation 4}$$

In Equation 4, i may represent a link index, e may represent a probability of transmission errors, $\lambda_i$ may represent an arrival rate of a link blocker (e.g., an item that may cause a link blockage) on the current link, and $T_i$ may represent a transmission time of a corresponding encoded packet.

A probability of the destination transceiver failing to receive the minimum subset may be determined in accordance with Equation 5.

$$F(x_1, \ldots, x_m; k) := Pr\left(\sum_{i=1}^{m} Y_i < k\right) \quad \text{Equation 5}$$

In Equation 5, x may represent the number of the encoded packets allocated on the current link, k may represent the minimum subset size; m may represent the number of links, Y may represent a number of encoded packets actually received by the destination transceiver on the current link.

The transceiver may perform packet encoding of the input packets to provide a low latency method that supplements physical layer coding. Linear packet encoding of the input packets may provide improved resiliency against the errors compared to non-linear packet encoding. In addition, the input packets may include information that is delay sensitive (e.g., information that includes a latency setting that is equal to or less than one hundred milliseconds). When a link blockage occurs (e.g., a link blockage error), subsequent packets transmitted on the corresponding link (e.g., encoded packets that are transmitted after the link blockage) may be dropped by the destination transceiver (e.g., may not be received or decoded by the destination transceiver). The destination transceiver may drop the subsequent packets because the latency of the subsequent packets exceeds the latency setting. Therefore, link blockage may cause the link blockage error to persist until an end of the transmission of the associated encoded packets on the corresponding link.

The transceiver may allocate the encoded packets to the links to reduce an impact of the link blockage error, the transmission error, or some combination thereof. The transceiver may allocate the encoded packets to improve data allocation. The transceiver may implement a first algorithm (e.g., a greedy algorithm), a second algorithm (e.g., a steepest descent algorithm), or some combination thereof. The transceiver may implement the first algorithm to allocate packets to a link that provides a greatest reliability, resiliency, or some combination thereof. The transceiver may implement the second algorithm to initially allocate the encoded packets on the links according to a pre-defined allocation scheme. In addition, the transceiver may iteratively shift allocation of an encoded packet from a current link to a different link to identify an allocation scheme that maximizes reliability, resiliency, or some combination thereof.

The transceiver may generate the encoded packets representative of the input packets. The transceiver may also be configured to determine the probability of the transmission error for each link. In addition, the transceiver may be configured to determine the probability of the link blockage error for each link. Further, the transceiver may be configured to determine an allocation scheme for the encoded packets on the links. The transceiver may determine the allocation scheme based on the probability of the transmission error and the probability of the link blockage error for each link. The transceiver may allocate the encoded packets on the links according to the allocation scheme. In addition, the transceiver may instruct to wirelessly transmit the encoded packets on the links.

The first algorithm may include linear complexity. The second algorithm may not include a linear complexity. The first algorithm and the second algorithm may reduce an impact of the errors, which may improve transmission of the encoded packets on the links. In addition, the first algorithm and the second algorithm may reduce a runtime to determine the allocation scheme compared to an exhaustive search that compares each allocation possibility.

These and other aspects of the present disclosure will be explained with reference to the accompanying figures. It is to be understood that the figures are diagrammatic and schematic representations of such example aspects, and are not limiting, nor are they necessarily drawn to scale. In the figures, features with like numbers indicate like structure and function unless described otherwise.

FIG. 1 illustrates a block diagram of an example operational environment 100 to wirelessly transmit encoded packets on multiple links 128*a-m* (generally referred to in the present disclosure as "link 128" or "links 128"), in accordance with at least one aspect described in the present disclosure. The operational environment 100 may include a transceiver 102 (e.g., a transceiver system) and a destination transceiver 103 (e.g., a destination transceiver system). The transceiver 102 may form at least a part of a source device and the destination transceiver 103 may form at least a part of a destination device.

The transceiver 102 may include a signal processor 104, a frontend 110, a memory 116, and transmit antennas 118. The memory 116 may store data being processed by the signal processor 104, the frontend 110, or some combination thereof.

The signal processor 104 may include, or may be implemented, partially or entirely, by circuitry and/or logic. Additionally or alternatively, one or more functionalities of the signal processor 104 may be implemented by logic, which may be executed by a machine and/or one or more processors. The signal processor 104 may include at least one memory (not illustrated in FIG. 1), which may be configured to store at least some of the information processed by the signal processor 104.

The signal processor 104 may include an encoder 106. The encoder 106 may receive input packets representative of information to be wirelessly transmitted to the destination transceiver 103. The encoder 106 may generate encoded packets representative of the input packets. For example, the encoder 106 may encode the input packets using an encoding vector to generate the encoded packets.

The signal processor 104 may determine the probability of the transmission error for each of the links 128. In addition, the signal processor 104 may determine the probability of the link blockage error for each of the links 128. The signal processor 104 may determine the probability of the link blockage error for the links 128 according to Equation 4. The signal processor 104 may determine the allocation scheme for the encoded packets on the links 128 based on the probability of the transmission error and the probability of the link blockage error for each of the links 128. Alternatively, the frontend 110 may determine the probability of the transmission error for each of the links 128, the probability of the link blockage error for each of the links 128, or some combination thereof. The encoder 106 may provide the encoded packets to a transmitter 112 of the frontend 110.

The frontend 110 may include, or may be implemented, partially or entirely, by circuitry and/or logic. Additionally or alternatively, one or more functionalities of the frontend 110 may be implemented by logic.

The transmitter 112 may allocate and provide the encoded packets to the transmit antennas 118 based on the allocation scheme and the link 128 associated with a corresponding transmit antenna of the transmit antennas 118. For example, a first transmit antenna of the transmit antennas 118 may be associated with a first link 128a and the transmitter 112 may provide each encoded packet allocated to the first link to the first transmit antenna. In addition, the transmitter 112 may instruct the transmit antennas 118 to wirelessly transmit the encoded packets on the links 128a-m.

The destination transceiver 103 may include a destination signal processor 113, a destination frontend 111, and a destination memory 117. In addition, the destination transceiver 103 may include receive antennas 120. The destination memory 117 may store data being processed by the destination signal processor 113, the destination frontend 111, or some combination thereof.

The receive antennas 120 may wirelessly receive the encoded packets. The receive antennas 120 may provide the encoded packets to a receiver 108 of the destination frontend 111. The receiver 108 may convert the encoded packets to signals that are compatible with the destination signal processor (e.g., convert analog signals to digital signals). The receiver 108 may provide the encoded packets to a decoder 114 of the destination signal processor 113. The decoder 114 may recover the input packets from the encoded packets using an encoding vector.

Figure 2:
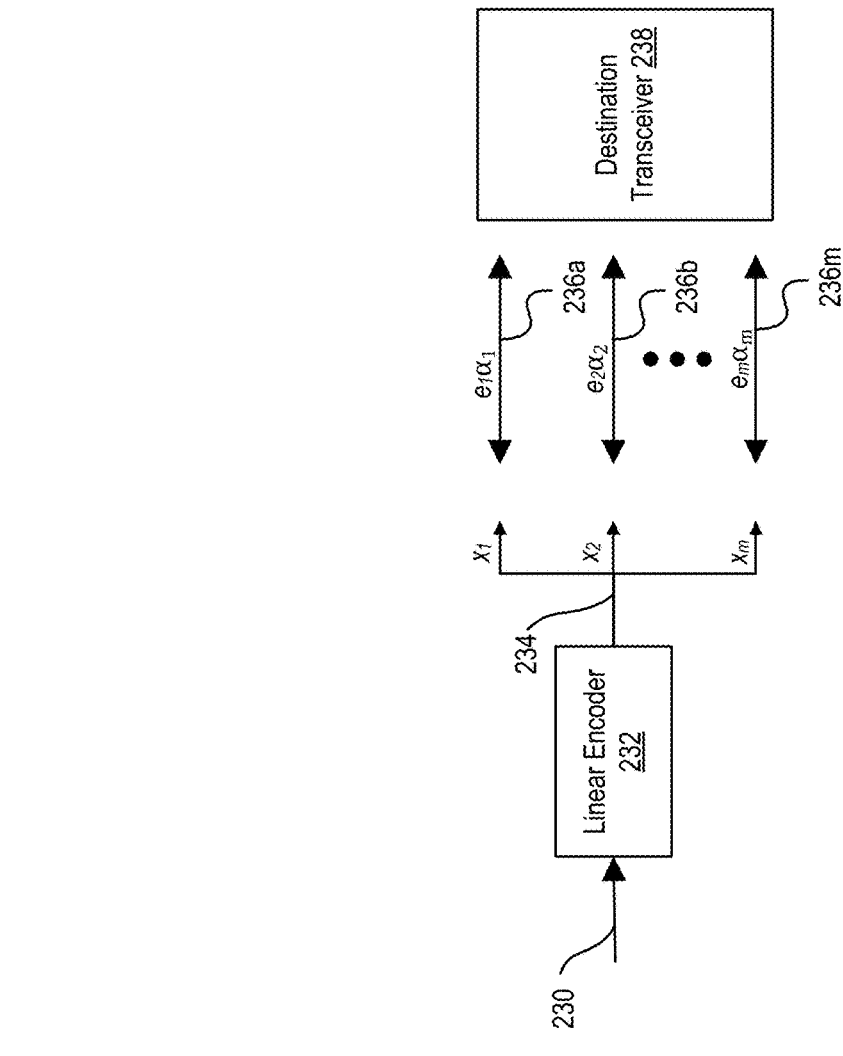
FIG. 2 illustrates a block diagram of an example operational environment to wirelessly transmit encoded packets on multiple links.

FIG. 2 illustrates a block diagram of an example operational environment 200 to wirelessly transmit encoded packets 234 on multiple links 236a-m, in accordance with at least one aspect described in the present disclosure. The operational environment 200 may include a linear encoder 232 that forms at least a part of a transceiver within a source device. The linear encoder 232 may correspond to the encoder 106 of FIG. 1.

The linear encoder 232 may receive input packets 230. The input packets 230 may include a k number of packets. The linear encoder 232 may encode the input packets 230 using an encoding vector (not illustrated in FIG. 1). The linear encoder 232 may generate encoded packets 234 representative of the input packets 230. The encoded packets 234 may include an n number of packets. The encoded packets 234 may be wirelessly transmitted on the links 236a-m based on an allocation scheme that reduces the impact of the link blockage error, the transmission error, or some combination thereof.

The encoded packets 234 may be wirelessly transmitted on the links 236a-m to a destination transceiver 238 within a destination device. The destination transceiver 238 may correspond to the destination transceiver 103 of FIG. 1. The destination transceiver 238 may decode the encoded packets to recover the input packets 230 (e.g., recover the information the input packets 230 represent). The destination transceiver 238 may decode at least a k number of encoded packets to recover the input packets 230.

Figure 3:
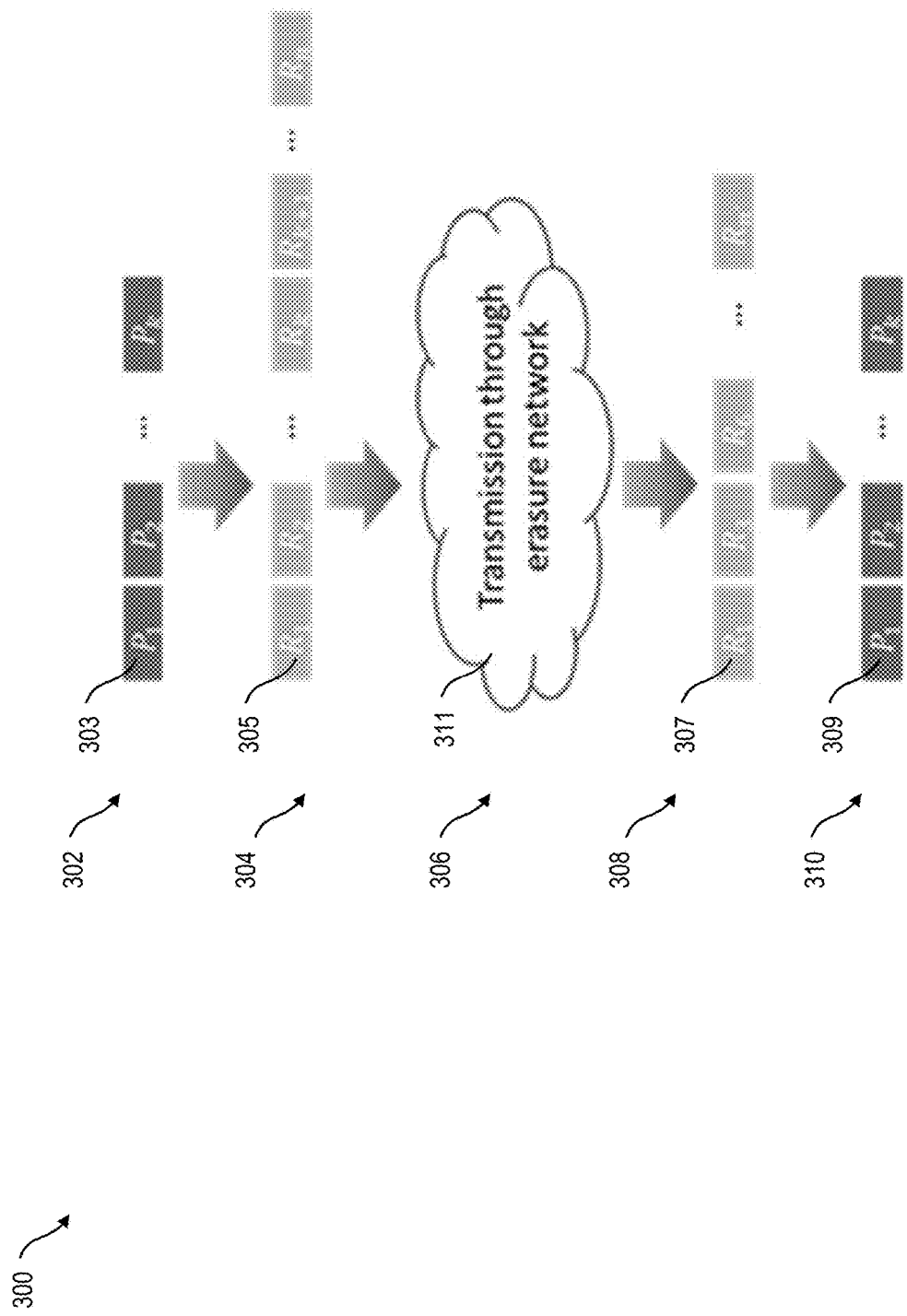
FIG. 3 illustrates a flowchart of an exemplary method to wirelessly transmit encoded packets and receive received packets on multiple links.

FIG. 3 illustrates a flowchart of an exemplary method 300 to wirelessly transmit encoded packets 305 and wirelessly receive received packets 307 on multiple links, in accordance with at least one aspect described in the present disclosure. The method 300 may be performed by any suitable system, apparatus, or device with respect to wirelessly transmitting the encoded packets 305 and receiving the received packets 307. For example, the transceiver 102, the signal processor 104, the frontend 112, the destination transceiver 103, the destination frontend 111, the destination signal processor 113, or some combination thereof of FIG. 1 may perform or direct performance of one or more of the operations associated with the method 300. The method 300 is described in relation to FIG. 3 as being performed by the transceiver 102 and the destination transceiver 103 for example purposes. The method 300 may include one or more blocks 302, 304, 306, 308, and 310. Although illustrated with discrete blocks, the operations associated with one or more of the blocks of the method 300 may be divided into additional blocks, combined into fewer blocks, or eliminated, depending on the particular implementation.

At block 302, the transceiver 102 may receive the input packets 302 (e.g., packets representative of information to be wirelessly transmitted to the destination transceiver 103). At 304, the transceiver 102 may encode the input packets 303 using an encoding vector to generate the encoded packets 305. At block 306, the transceiver 102 may wirelessly transmit the encoded packets 305 through a network 311 that includes multiple links.

At block 308, the destination transceiver 103 may receive the wirelessly transmitted encoded packets from the network 311. The destination transceiver 103 may receive the wirelessly transmitted encoded packets as received packets 307. At block 310, the destination transceiver 103 may decode the received packets (e.g., solve a linear equation) to generate output packets 309.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Figure 4:
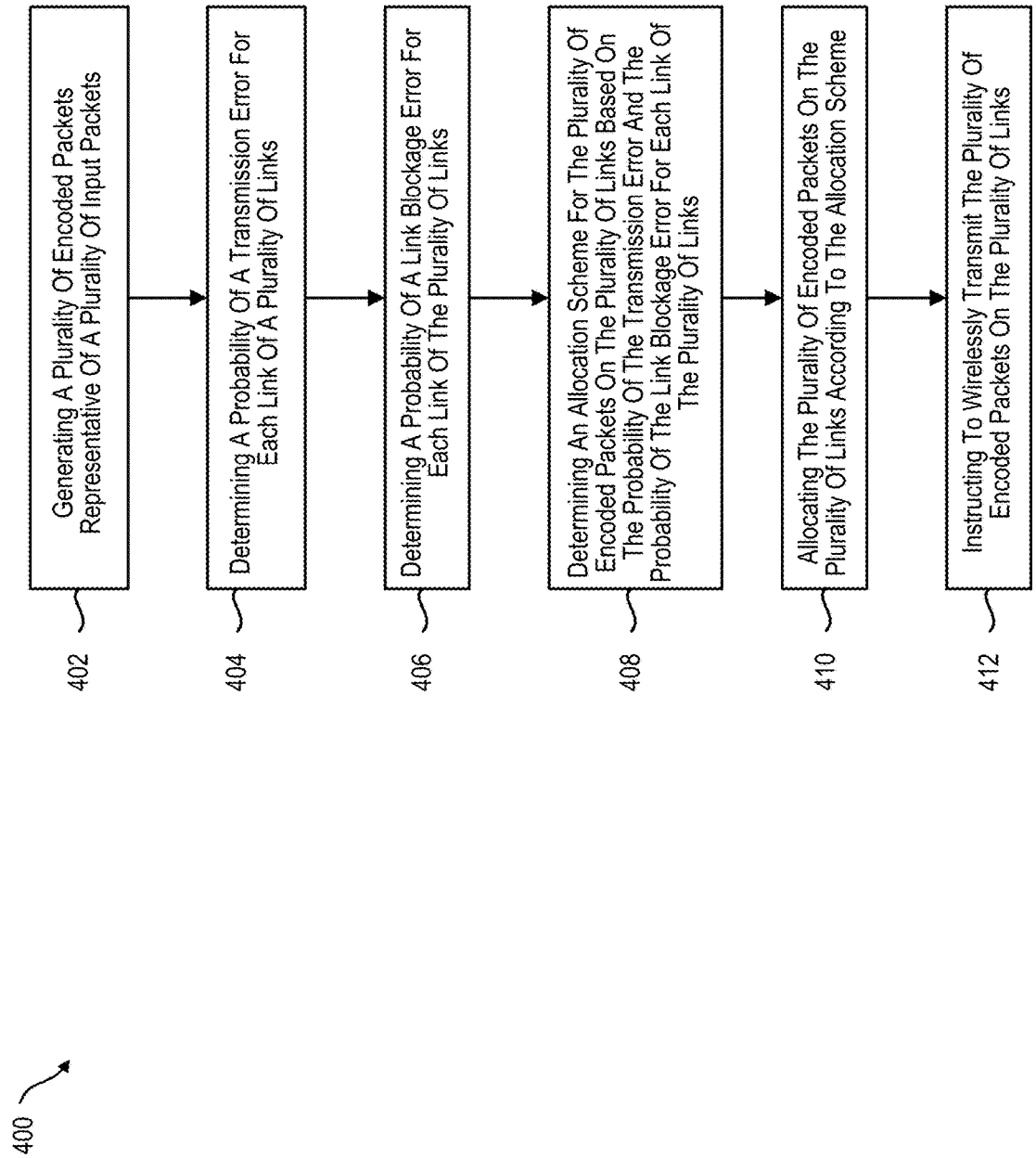
FIG. 4 illustrates a flowchart of an exemplary method to wirelessly transmit encoded packets on multiple links.

FIG. 4 illustrates a flowchart of an exemplary method 400 to wirelessly transmit encoded packets on multiple links, in accordance with at least one aspect described in the present disclosure. The method 400 may be performed by any suitable system, apparatus, or device with respect to wirelessly transmitting the encoded packets. For example, the transceiver 102, the signal processor 104, the frontend 112, or some combination thereof of FIG. 1 may perform or direct performance of one or more of the operations associated with the method 400. The method 400 is described in relation to FIG. 4 as being performed by the transceiver 102 for example purposes The method 400 may include one or more blocks 402, 404, 406, 408, 410, and 412. Although illustrated with discrete blocks, the operations associated with one or more of the blocks of the method 400 may be divided into additional blocks, combined into fewer blocks, or eliminated, depending on the particular implementation.

At block 402, the transceiver 102 may generate a plurality of encoded packets representative of a plurality of input packets. At block 404, the transceiver 102 may determine a probability of a transmission error for each link of a plurality of links. At block 406, the transceiver 102 may determine a probability of a link blockage error for each link of the plurality of links. At block 408, the transceiver 102 may determine an allocation scheme for the plurality of encoded packets on the plurality of links based on the probability of the transmission error and the probability of the link blockage error for each link of the plurality of links. At block 410, the transceiver 102 may allocate the plurality of encoded packets on the plurality of links according to the allocation scheme. At block 412, the transceiver 102 may instruct to wirelessly transmit the plurality of encoded packets on the plurality of links.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Figure 5:
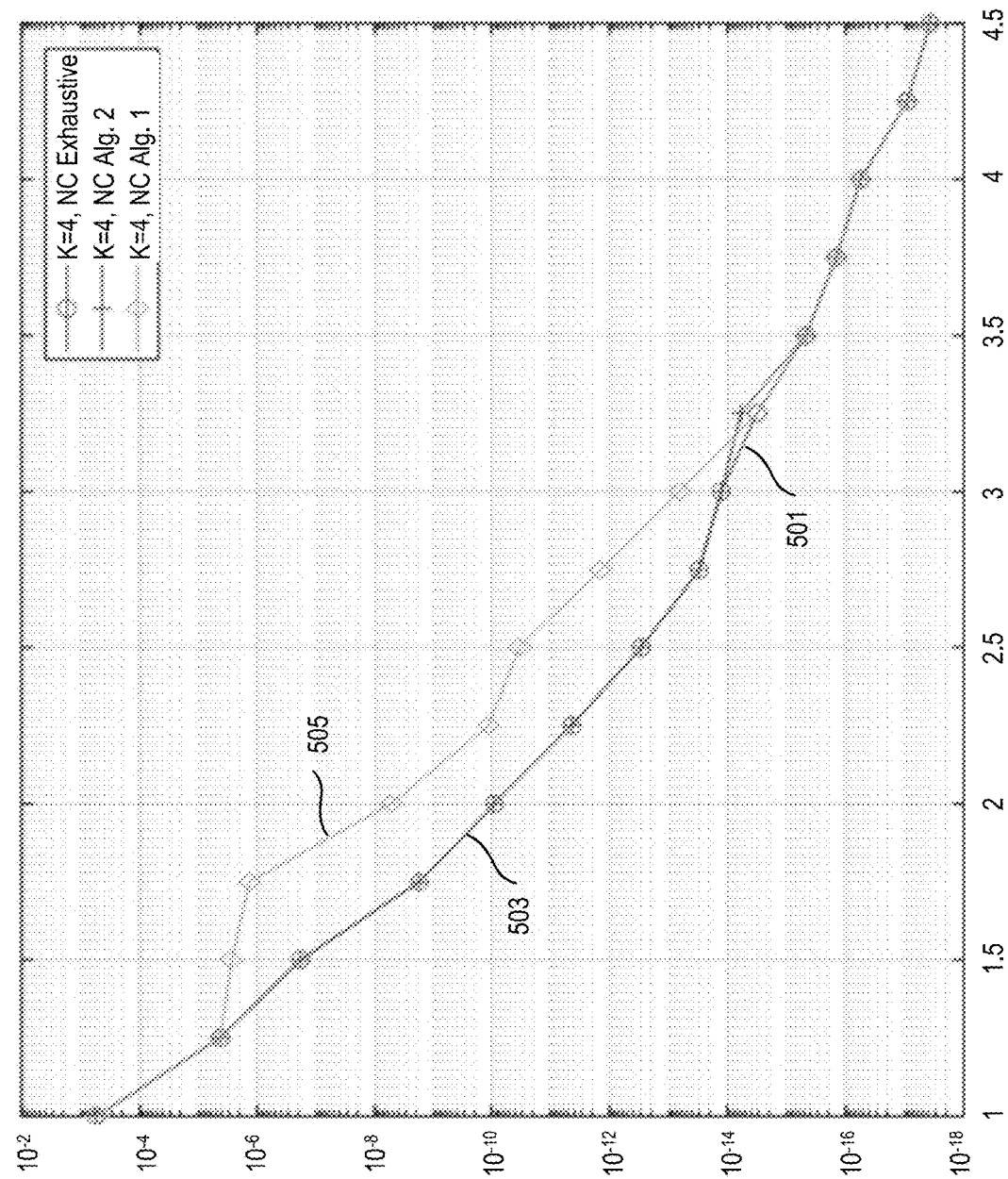
FIG. 5 illustrates a graphical representation of simulations of allocating encoded packets according to various allocation schemes.

FIG. 5 illustrates a graphical representation 500 of simulations of allocating encoded packets according to various allocation schemes, in accordance with at least one aspect described in the present disclosure.

Curves 501, 503, and 505 respectively represent a probability of packet loss according to an exhaustive algorithm, the second algorithm, and the first algorithm. For the simulations, the number of input packets was set to four (e.g., the minimum subset size), the number of links was set to four, the probability of the transmission error was randomly selected between $10^{-1}$ and $10^{-4}$, and the probability of the link blockage error was randomly selected between $10^{-3}$ and $10^{-6}$.

The number of encoded packets used for the simulation ranged between four and eighteen packets. The X axis represents the number of encoded packets divided by the number of input packets. The Y axis represents the probability of a decoding failure.

Figure 6:
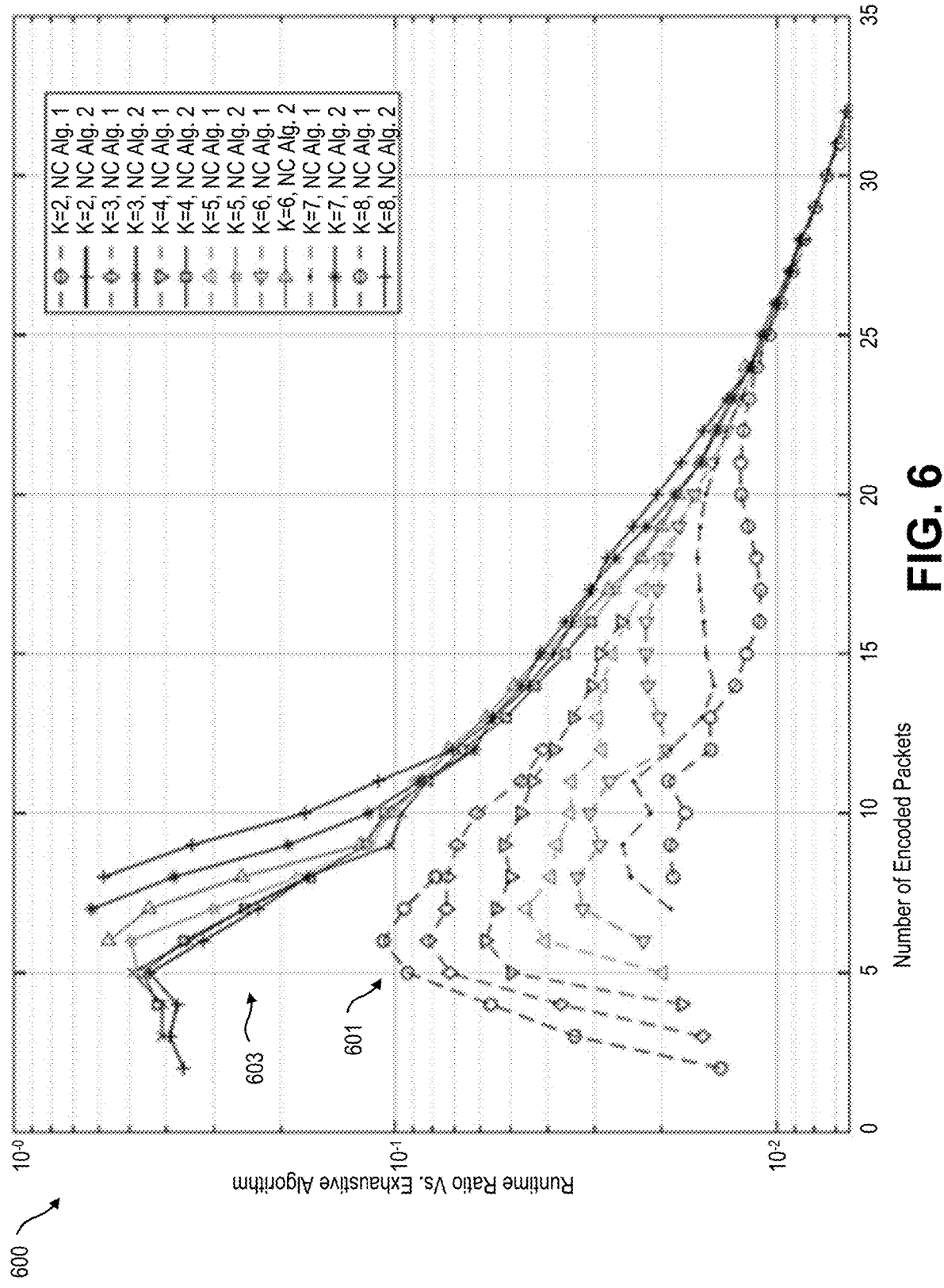
FIG. 6 illustrates a graphical representation of simulation runtimes for allocating encoded packets according to the first algorithm and the second algorithm, all according to at least one embodiment described in the present disclosure.

FIG. 6 illustrates a graphical representation 600 of simulation runtimes for allocating encoded packets according to the first algorithm and the second algorithm, in accordance with at least one aspect described in the present disclosure. For the simulations, the number of input packets varied between two and eight, the number of links was set to three, the number of encoded packets varied between zero and thirty-five. The Y axis represents the ratio of the runtime of the corresponding algorithm compared to the runtime of the exhaustive algorithm.

Curves 601 represent runtime ratios of the first algorithm compared to the runtime of the exhaustive algorithm as the number of encoded packets changes. Curves 603 represent runtime ratios of the second algorithm compared to exhaustive algorithm as the number of encoded packets changes. As illustrated in FIG. 6, the runtime for the first algorithm and the second algorithm decrease as the number of encoded packets increase compared to the exhaustive algorithm.

The transceiver may allocate the encoded packets to the links to reduce the impact of the link blockage error, the transmission error, or some combination thereof. The transceiver may allocate the encoded packets to improve data allocation. The transceiver may implement a first algorithm (e.g., a greedy algorithm), a second algorithm (e.g., a steepest descent algorithm), or some combination thereof.

The transceiver may determine an allocation scheme using a pre-defined subset size of the encoded packets for the destination transceiver to receive to recover the input packets (e.g., the minimum subset) and a pre-defined number of encoded packets. The transceiver may determine the allocation scheme also based on the probability of the transmission error and the probability of the link blockage error for each of the links.

The transceiver may form a part of a system for wireless communication. The transceiver may include a processor. The transceiver may be configured to receive input packets representative of information to be wirelessly transmitted to a destination device. The transceiver may also generate encoded packets representative of the input packets. The transceiver may encode the input packets using an encoding vector. The encoded packets may represent delay sensitive data traffic. The delay sensitive data traffic may include a latency setting that is equal to or less than one hundred milliseconds.

The transceiver may allocate the encoded packets on the links according to the allocation scheme. In addition, the transceiver may instruct to wirelessly transmit the encoded packets on the links.

The transceiver may determine the probability of the transmission error and the probability of the link blockage error for each of the links. The transceiver may also determine the allocation scheme for the encoded packets on the links based on the probability of the transmission error and the probability of the link blockage error for each of the links. The allocation scheme may further be determined based on the probability of failing to receive the minimum subset (e.g., a decoding failure event).

The transceiver may determine the probability of the decoding failure event according Equation 6.

$$\sum_{l_1=0}^{x_1} \cdots \sum_{l_m=0}^{x_m} \prod_{i=1}^{m} \alpha_i^{1_{\{l_i < x_i\}}} (1-\alpha_i)^{l_i}$$

$$\left[ \sum_{w_1=0}^{l_1} \cdots \sum_{w_m=0}^{l_m} 1_{\{\sum_{t=1}^{m} w_t < k\}} \prod_{j=1}^{m} \binom{l_j}{w_j} e_j^{l_j - w_j} (1-e_j)^{w_j} \right]$$

Equation 6

In Equation 6, i may represent a link index of a current link for considering the probability of the link blockage error, m may represent a total number of links, x may represent the number of encoded packets allocated on a corresponding current link, α may represent the probability of the link blockage error for the corresponding current link, e may represent the probability of the transmission error for the corresponding current link, $1_{\{l_i < x_i\}}$ and $1_{\{\sum_{t=1}^{m} w_t < k\}}$ may represent indicator functions of a corresponding condition, l may represent a number of the encoded packets on the corresponding current link not affected by the link blockage error, w may represent a number of the encoded packets on the corresponding current link that are further not affected by the transmission error, j may represent a link index of a current link for considering the probability of the transmission error, t may represent a link index of a current link for considering the corresponding indicator function, and k may represent the minimum subset size. The encoded packets corresponding to w may include a subset of the encoded packets selected from the encoded packets associated with l.

The transceiver may determine the allocation scheme according to the first algorithm (e.g., the greedy algorithm). For the first algorithm, the transceiver may identify a function link (e.g., a link index that corresponds to a link) that minimizes a value determined according to Equation 7.

$$(1-\alpha_i)(1-e_i)$$

Equation 7

In Equation 7, i may represent the link index of the current link, a may represent the probability of the link blockage error for the current link, and e may represent the probability of the transmission error for the current link. The transceiver may initialize allocation of a k number of encoded packets on the current link corresponding to the link that minimalizes the value determined according to Equation 7. The k number of encoded packets on the function link may include a number of encoded packets equal to the minimum subset size.

The transceiver may iteratively identify the link index that maximizes a function value for each additional encoding packet (e.g., each encoded packet that is not part of the k number of encoded packets). The transceiver may determine the function value according to Equation 8.

$$\Delta F_i(x_1, \ldots, x_m; k) \qquad \text{Equation 8}$$

In Equation 8, i may represent a link index that an additional encoded packet is allocated on, x may represent the number of encoded packets allocated on the corresponding links, and k may represent the minimum subset size. Each iteration, the transceiver may iteratively increment the link index by one and allocate a remaining encoded packet accordingly to identify a link that results in a maximal function value. The transceiver may iteratively allocate remaining encoded packets a number of times equal to the number of encoded packets minus the minimum subset size (e.g., n–k times).

The transceiver may determine the function value of each of the links according to Equation 7. The transceiver may identify a link that corresponds to a minimum function value as the function link. The transceiver may allocate the k number of encoded packets on the function link (e.g., allocate the minimum subset) as an initial allocation scheme.

The transceiver may iteratively allocate a first additional encoded packet of the encoded packets on each of the links to obtain a first set of adjusted allocation schemes. Each adjusted allocation scheme of the first set of adjusted allocation schemes may include the k number of encoded packets allocated on the function link. The first additional encoded packet may include an encoded packet within a difference between all of the encoded packets and the k number of encoded packets allocated on the function link.

The transceiver may determine a difference value between each adjusted allocation scheme of the first set of adjusted allocation schemes and a previous allocation scheme (e.g., the initial allocation scheme or a most recent maximum allocation scheme). The transceiver may determine the difference value according to Equation 9.

$$(1-\alpha_i)^{x_i+1} \cdot \sum_{\substack{(l_r, r \neq i) \\ 0 \leq l_r \leq x_r, \forall r \neq i}} \prod_{1 \leq r \leq m}^{r \neq i} \alpha_r^{1\{l_r < x_r\}} (1-\alpha_r)^{l_r} \cdot$$

$$\left\{ \sum_{\substack{(w_j, j \neq i) \\ 0 \leq w_j \leq l_j, \forall j \neq i}} \left[ \prod_{1 \leq j \leq m}^{j \neq i} \binom{l_j}{w_j} e_j^{l_j - w_j} (1-e_j)^{w_j} \right] \cdot \right.$$

$$\left. \left( k - \sum_{\substack{t \neq i \\ 1 \leq t \leq m}} w_t - 1 \right) e_i^{x_i - k + \Sigma_{t \neq i} w_t + 1} (1-e_i)^{k - \Sigma_{t \neq i} w_t} \right\}$$

$$\text{Equation 9}$$

In Equation 9, i may represent a link index that a corresponding additional encoded packet (e.g., the first additional encoded packet or subsequent additional encoded packets) is allocated on according to a corresponding adjusted allocation scheme, j and r may represent link indices of current links, a may represent the probability of the link blockage error for a corresponding current link, e may represent the probability of the transmission error for the corresponding current link, x may represent the number of encoded packets allocated on the corresponding current links according to the previous allocation scheme (e.g., the initial allocation scheme or the most recent maximum allocation scheme), l may represent the number of the encoded packets on the corresponding current links not affected by the link blockage error, w may represent the number of the encoded packets on the corresponding current links that are further not affected by the transmission error, t may represent a link index for summing over the encoded packets associated with w, and k may represent the minimum subset size.

The transceiver may identify an adjusted allocation scheme of the first set of adjusted allocation schemes that corresponds to a maximum difference value as a first maximum allocation scheme. A secondary allocation scheme may include the k number of encoded packets allocated on the function link and the first additional encoded packet allocated according to the first maximum allocation scheme.

The transceiver may iteratively allocate a second additional encoded packet of the encoded packets on each of the links to obtain a second set of adjusted allocation schemes. The second additional encoded packet may include an encoded packet within the difference between all of the encoded packets and the k number of encoded packets allocated on the function link.

The transceiver may determine the difference value between each adjusted allocation scheme of the second set of adjusted allocation schemes and the secondary allocation scheme (e.g., a most recently previous allocation scheme) according to Equation 9. The transceiver may identify an adjusted allocation scheme of the second set of adjusted allocation schemes that corresponds to a maximum difference value as a second maximum allocation scheme. The allocation scheme may include the k number of encoded packets allocated on the function link, the first additional encoded packet allocated according to the first maximum allocation scheme, and the second additional encoded packet allocated according to the second maximum allocation scheme. The transceiver may repeat the iterative process of the first algorithm to allocate each of the encoded packets within the difference between all of the encoded packets and the k number of encoded packets allocated on the function link.

An example of the first algorithm in which the minimum subset size is equal to two, the number of links is equal to three, and the number of encoded packets is equal to four is now discussed. The transceiver may identify a third link as a function link according to Equation 7. The transceiver may allocate a first encoded packet and a second encoded packet on the third link (e.g., allocate the minimum subset on the third link) to obtain the initial allocation scheme.

The transceiver may iteratively allocate a third encoded packet on the links. The transceiver may allocate the third encoded packet on a first link to obtain a first adjusted allocation scheme. The transceiver may also allocate the third encoded packet on a second link to obtain a second adjusted allocation scheme. In addition, the transceiver may allocate the third encoded packet on the third link along with the first encoded packet and the second encoded packet to obtain a third adjusted allocation scheme. Each of the first adjusted allocation scheme, the second adjusted allocation scheme, and the third adjusted allocation scheme may include the first encoded packet and the second encoded packet allocated on the third link.

The transceiver may determine the difference value between the initial allocation scheme and the first adjusted allocation scheme according to Equation 9. The transceiver may also determine the difference value between the initial allocation scheme and the second adjusted allocation scheme according to Equation 9. In addition, the transceiver may determine the difference value between the initial allocation scheme and the third adjusted allocation scheme according to Equation 9. The transceiver may identify the second adjusted allocation scheme as corresponding to the maximum difference value as a first maximum allocation scheme.

The transceiver may iteratively allocate a fourth encoded packet on the links. The transceiver may allocate the fourth encoded packet on the first link to obtain a first additional adjusted allocation scheme. The transceiver may also allocate the fourth encoded packet on the second link along with the third encoded packet to obtain a second additional adjusted allocation scheme. In addition, the transceiver may allocate the fourth encoded packet on the third link along with the first encoded packet and the second encoded packet to obtain a third additional adjusted allocation scheme. Each of the first additional adjusted allocation scheme, the second additional adjusted allocation scheme, and the third additional adjusted allocation scheme may include the first encoded packet and the second encoded packet allocated on the third link and the third encoded packet allocated on the second link.

The transceiver may determine the difference value between the second adjusted allocation scheme (e.g., the first maximum allocation scheme) and the first additional adjusted allocation scheme according to Equation 9. The transceiver may also determine the difference value between the second adjusted allocation scheme and the second additional adjusted allocation scheme according to Equation 9. In addition, the transceiver may determine the difference value between the second adjusted allocation scheme and the third additional adjusted allocation scheme according to Equation 9. The transceiver may identify the third additional adjusted allocation scheme as corresponding to the maximum difference value as a second maximum allocation scheme.

The allocation scheme may include the third additional adjusted allocation scheme (e.g., the second maximum allocation scheme). For example, the allocation scheme may allocate the first encoded packet, the second encoded packet, and the fourth encoded packet on the third link and the third encoded packet on the second link.

The transceiver may determine the allocation scheme according to the second algorithm (e.g., the steepest descent algorithm). For the second algorithm, the transceiver may initially allocate each of the encoded packets on the links according to a pre-defined allocation scheme. The pre-defined allocation scheme may include an allocation scheme in which a difference between the number of encoded packets allocated on any two links is equal to one or less.

The transceiver may shift allocation of an encoded packet from a current link (e.g., a link corresponding to link index i for which $x_i>0$) to each of the different links (e.g., on each link corresponding to link index j for which $i \neq j$) to obtain a current set of adjusted allocation schemes. The transceiver may identify an adjusted allocation scheme of the current set of adjusted allocation schemes as a minimum allocation scheme. The transceiver may determine a descent difference value between a previous allocation scheme (e.g., the pre-defined allocation scheme or a most recent minimum allocation scheme) and the current minimum allocation scheme. The transceiver may determine the descent difference value according to Equation 10.

$$\Delta_{ij} := F(x_1', \ldots, x_m'; k) - F(x_1, \ldots, x_m; k) \quad \text{Equation 10}$$

In Equation 10, x' may represent the number of encoded packets allocated on a corresponding link according to the current minimum allocation scheme, k may represent the minimum subset size, and x may represent the number of encoded packets allocated on a corresponding link according to the previous allocation scheme (e.g., for a first iteration of the second algorithm, the pre-identified allocation scheme and for subsequent iterations of the second algorithm the most recent minimum allocation scheme). The transceiver may identify the minimum allocation scheme according to Equation 10.

Alternatively, the transceiver may determine the descent difference value according to Equation 11.

$$\Delta_{ij} = \Delta F_i(x_1, \ldots, x_i-1, \ldots, x_m; k) - \Delta F_j(x_1, \ldots, x_j-1, \ldots, x_m; k) \quad \text{Equation 11}$$

In Equation 11, i may represent the link index of a current link (e.g., the link a corresponding encoded packet was allocated) according to the previous allocation scheme (e.g., the pre-defined allocation scheme or the most recent minimum allocation scheme), j may represent the link index of a current link according to the current minimum allocation scheme, m may represent the total number of the links, x may represent the number of encoded packets allocated on a corresponding current link according to the previous allocation scheme, and k may represent the minimum subset size. The transceiver may identify the minimum allocation scheme according to Equation 11 in which each of the adjusted allocation schemes is compared to each other. Equation 11 may reduce a complexity of the second algorithm compared to Equation 10.

A negative descent difference value may indicate an improvement in probability of packet loss (e.g., a reduction in the probability of the packet loss). If the descent difference value for a current iteration is greater than or equal to a threshold value, the descent difference value may be set to zero. The threshold value may include any value equal to or less than zero. Alternatively, the threshold value may include any value greater than zero. The transceiver may iteratively repeat shifting of the encoded packets on the links until the descent difference value between the previous allocation scheme and the current minimum allocation scheme is equal to or greater than the threshold value.

The transceiver may determine at least a portion of Equation 11 using Equation 12.

$$\Delta F_i(x_1, \ldots, x_m; k) = \\ (1-\alpha_i)^{x_i+1} \cdot \sum_{\substack{(l_r, r \neq i) \\ 0 \leq l_r \leq x_r, \forall r \neq i, 1 \leq r \leq m}} \prod_{r \neq i} \alpha_r^{1_{(l_r < x_r)}} (1-\alpha_r)^{l_r} \cdot \\ \left\{ \sum_{\substack{(w_j, j \neq i) \\ 0 \leq w_j \leq l_j, \forall j \neq i}} \left[ \prod_{\substack{j \neq i \\ 1 \leq j \leq m}} \binom{l_j}{w_j} e_j^{l_j - w_j}(1-e_j)^{w_j} \right] \cdot \\ \left( k - \sum_{\substack{t \neq i \\ 1 \leq t \leq m}} w_t - 1 \right) e_i^{x_i - k + \sum_{t \neq i} w_t + 1}(1-e_i)^{k - \sum_{t \neq i} w_t} \right\} \quad \text{Equation 12}$$

In Equation 12, α may represent the probability of the link blockage error for a corresponding current link, e may represent the probability of the transmission error for a corresponding current link, l may represent the number of the encoded packets on the corresponding current link not affected by the link blockage error, w may represent the number of the encoded packets on the corresponding current link that are further not affected by the transmission error, and k may represent the minimum subset size. The encoded packets corresponding to w may include a subset of the encoded packets associated with l.

The transceiver may initialize the packet allocation according to the pre-defined allocation scheme. The pre-defined allocation scheme may include an equalized allocation scheme in which a difference between the number of encoded packets allocated on each of the links is equal to or less than one. The transceiver may iteratively shift allocation of a first encoded packet on the links. The transceiver may shift allocation of the first encoded packet from a link to each of the different links to obtain a first set of adjusted allocation schemes.

The transceiver may identify an adjusted allocation scheme of the first set of adjusted allocation schemes that corresponds to a minimal probability of the decoding failure event as a first minimum allocation scheme. The transceiver may identify the first minimum allocation scheme according to Equation 10 or Equation 11. The transceiver may determine the descent difference value between the first minimum allocation scheme and the pre-defined allocation scheme according to Equation 10 or Equation 11. The transceiver, responsive to the descent difference value being equal to or greater than the threshold value, may identify the first minimum allocation scheme as the allocation scheme.

The transceiver may determine a descent value of the pre-defined allocation scheme according to Equation 10 or Equation 11. The transceiver, responsive to the descent difference value between the first minimum allocation scheme and the pre-defined allocation scheme being equal to or greater than the threshold value, may identify the pre-defined allocation scheme as the allocation scheme.

The transceiver, responsive to the descent difference value between the first minimum allocation scheme and the pre-defined allocation scheme being less than the threshold value, may iteratively shift allocation of a second encoded packet from a corresponding link to each of the different links to obtain a second set of adjusted allocation schemes. The transceiver may also identify an adjusted allocation scheme of the second set of adjusted allocation schemes that corresponds to a minimal probability of a decoding failure event as a second minimum allocation scheme. The transceiver may identify the second minimum allocation scheme according to Equation 10 or Equation 11. In addition, the transceiver may determine a second descent difference value between the second minimum allocation scheme and the first minimum allocation scheme according to Equation 10 or Equation 11. The transceiver, responsive to the second descent difference value being equal to or greater than the threshold value, may identify the second minimum allocation scheme as the allocation scheme. The transceiver may repeat the iterative process of shifting the encoded packets until a difference between the most recent minimum allocation scheme and the current minimum allocation scheme is greater than or equal to the threshold value.

The transceiver, responsive to the second descent difference value being equal to or greater than the threshold value, may identify the first minimum allocation scheme as the allocation scheme.

An example of the second algorithm in which the number of links is equal to three and the number of encoded packets is equal to four is now discussed. The transceiver may allocate the encoded packets on the links according to the pre-defined allocation scheme. For example, the transceiver may allocate a first encoded packet and a fourth encoded packet on a first link, a second encoded packet on a second link, and a third encoded packet on a third link.

The transceiver may iteratively shift allocation of the encoded packets on the links to obtain the first set of adjusted allocation schemes. The transceiver may shift allocation of the fourth encoded packet from the first link to the second link to obtain a first adjusted allocation scheme. The transceiver may also shift allocation of the fourth encoded packet from the first link to the third link to obtain a second adjusted allocation scheme. The transceiver may repeat this process for the second encoded packet to obtain a third adjusted allocation scheme and a fourth adjusted allocation scheme. The transceiver may also repeat this process for the third encoded packet to obtain a fifth adjusted allocation scheme and a sixth adjusted allocation scheme.

The transceiver may identify the second adjusted allocation scheme as the first minimum allocation scheme according to Equation 10 or Equation 11. The transceiver may also determine the descent difference value between the first minimum allocation scheme and the pre-defined allocation scheme according to Equation 10 or Equation 11. The transceiver, responsive to the descent difference value being equal to or greater than the threshold value, may identify the first minimum allocation scheme as the allocation scheme (e.g., the allocation scheme may allocate the first encoded packet on the first link, the second encoded packet on the second link, and the third encoded packet and the fourth encoded packet on the third link).

The transceiver, responsive to the descent difference value between the first minimum allocation scheme and the pre-defined allocation scheme being less than the threshold value, may iteratively shift allocation of the encoded packets on the links to obtain the second set of adjusted allocation schemes. The transceiver may shift allocation of the second encoded packet from the second link to the first link to obtain a first additional adjusted allocation scheme. The transceiver may also shift allocation of the second encoded packet from the second link to the third link to obtain a second additional adjusted allocation scheme. The transceiver may repeat this process for the first encoded packet to obtain a third additional adjusted allocation scheme and a fourth additional adjusted allocation scheme. The transceiver may also repeat this process for the third encoded packet to obtain a fifth additional adjusted allocation scheme and a sixth additional adjusted allocation scheme.

The transceiver may identify the first additional adjusted allocation scheme as the second minimum allocation scheme according to Equation 10 or Equation 11. The transceiver may also determine the descent difference value between the second minimum allocation scheme and the first minimum allocation scheme according to Equation 10 or Equation 11. The transceiver, responsive to the descent difference value being equal to or greater than the threshold value, may identify the second minimum allocation scheme as the allocation scheme (e.g., the allocation scheme may allocate the first encoded packet and the second encoded packet on the first link and the third encoded packet and the fourth encoded packet on the third link). The transceiver may repeat this process until the descent difference value between a current minimum allocation scheme and a most recent allocation scheme is equal to or greater than the threshold value.

Example 1 may include a system for wireless communication, the system including: a processor configured to: generate a plurality of encoded packets representative of a plurality of input packets; determine a probability of a transmission error for each link of a plurality of links; determine a probability of a link blockage error for each link of the plurality of links; determine an allocation scheme for the plurality of encoded packets on the plurality of links based on the probability of the transmission error and the probability of the link blockage error for each link of the plurality of links; allocate the plurality of encoded packets on the plurality of links according to the allocation scheme; and instruct to wirelessly transmit the plurality of encoded packets on the plurality of links.

Example 2 may include the system of example 1, wherein the processor is further configured to determine a probability of a decoding failure event in which a subset of a minimum size of the plurality of encoded packets to recover the plurality of input packets is not received based on the probability of the transmission error and the probability of the link blockage error for each link of the plurality of links, wherein the allocation scheme is determined based on the probability of failing to receive the subset of the minimum size of the plurality of encoded packets to recover the plurality of input packets.

Example 3 may include the system of example 2, wherein the probability of the decoding failure event is determined according to Equation 6.

Example 4 may include the system of example 1, wherein the processor is configured to determine the allocation scheme for the plurality of encoded packets on the plurality of links by: determining a function value of each link of the plurality of links according to Equation 7; identifying a function link of the plurality of links that corresponds to a minimum function value; allocating a k number of encoded packets on the function link, wherein k represents the subset of the minimum size of the plurality of encoded packets to recover the plurality of input packets; iteratively allocating an additional encoded packet of the plurality of encoded packets on each link of the plurality of links to obtain a plurality of adjusted allocation schemes, wherein the additional encoded packet includes an encoded packet within a difference between the plurality of encoded packets and the k number of encoded packets allocated on the function link; determining a difference value between each adjusted allocation scheme of the plurality of adjusted allocation schemes and a previous allocation scheme according to Equation 9; and identifying an adjusted allocation scheme of the plurality of adjusted allocation schemes that corresponds to a maximum difference value as a maximum allocation scheme, wherein the allocation scheme includes the k number of encoded packets allocated on the function link and the additional encoded packet allocated according to the maximum allocation scheme.

Example 5 may include the system of example 4, wherein the additional encoded packet includes a first additional encoded packet, the plurality of adjusted allocation schemes include a first plurality of adjusted allocation schemes, the difference value includes a first difference value, the maximum allocation scheme includes a first maximum allocation scheme, and the processor is further configured to determine the allocation scheme for the plurality of encoded packets on the plurality of links by: iteratively allocating a second additional encoded packet of the plurality of encoded packets on each link of the plurality of links to obtain a second plurality of adjusted allocation schemes, wherein the second additional encoded packet includes an encoded packet within the difference between the plurality of encoded packets and the k number of encoded packets allocated on the function link; determining a second difference value between each adjusted allocation scheme of the second plurality of adjusted allocation schemes and the first maximum allocation scheme; and identifying an adjusted allocation scheme of the second plurality of adjusted allocation schemes that corresponds to a maximum difference value as a second maximum allocation scheme, wherein the allocation scheme further includes the second additional encoded packet allocated according to the second maximum allocation scheme.

Example 6 may include the system of example 1, wherein the processor is configured to determine the allocation scheme for the plurality of encoded packets on the plurality of links by: initializing a packet allocation according to a pre-defined allocation scheme; iteratively shifting allocation of a shift encoded packet of the plurality of encoded packets from an initial link on each different link of the plurality of links to obtain a plurality of adjusted allocation schemes; identifying an adjusted allocation scheme of the plurality of adjusted allocation schemes that corresponds to a minimal probability of a decoding failure event as a minimum allocation scheme; determining a descent difference value between the minimum allocation scheme and the pre-defined allocation scheme according to Equation 10; and responsive to the descent difference value being equal to or greater than a threshold value, identifying the minimum allocation scheme as the allocation scheme.

Example 7 may include the system of example 6, wherein the shift encoded packet includes a first shift encoded packet, the plurality of adjusted allocation schemes include a first plurality of adjusted allocation schemes, the descent difference value includes a first descent difference value, the minimum allocation scheme includes a first minimum allocation scheme, and responsive to the first descent difference value being less than the threshold value, the processor is further configured to: iteratively shift allocation of a second shift encoded packet of the plurality of encoded packets from an initial link on each different link of the plurality of links to obtain a second plurality of adjusted allocation schemes; identify an adjusted allocation scheme of the second plurality of adjusted allocation schemes that corresponds to a minimal probability of a decoding failure event as a second minimum allocation scheme; determine a second descent difference value between the second minimum allocation scheme and the first minimum allocation scheme; and responsive to the second descent difference value being equal to or greater than the threshold value, identify the second minimum allocation scheme as the allocation scheme.

Example 8 may include the system of example 6, wherein the pre-defined allocation scheme includes an equalized allocation scheme in which a difference between the number of encoded packets allocated on each link of the plurality of links is equal to or less than one.

Example 9 may include the system of example 1, wherein the processor is configured to determine the allocation scheme for the plurality of encoded packets on the plurality of links by: initializing a packet allocation according to a pre-defined allocation scheme; iteratively shifting allocation of a shift encoded packet of the plurality of encoded packets from an initial link on each different link of the plurality of links to obtain a plurality of adjusted allocation schemes;

identifying an adjusted allocation scheme of the plurality of adjusted allocation schemes that corresponds to a minimal probability of a decoding failure event as a minimum allocation scheme; determining a descent difference value between the minimum allocation scheme and the pre-defined allocation scheme according to Equation 11; and responsive to the descent difference value being equal to or greater than a threshold value, identifying the minimum allocation scheme as the allocation scheme.

Example 10 may include the system of example 9, wherein the processor is configured to determine $\Delta F_i(x_1, \ldots, x_i-1, \ldots, x_m;k) - \Delta F_j(x_1, \ldots, x_j-1, \ldots, x_m; k)$ according to Equation 12.

Example 11 may include the system of example 1, wherein the plurality of encoded packets represent delay sensitive data traffic including a latency setting equal to or less than ten milliseconds.

Example 12 may include a non-transitory computer-readable medium that includes a memory having computer-readable instructions stored thereon; and a processor operatively coupled to the memory and configured to read and execute the computer-readable instructions to perform or control performance of operations including: generating a plurality of encoded packets representative of a plurality of input packets; determining a probability of a transmission error for each link of a plurality of links; determining a probability of a link blockage error for each link of the plurality of links; determining an allocation scheme for the plurality of encoded packets on the plurality of links based on the probability of the transmission error and the probability of the link blockage error for each link of the plurality of links; allocating the plurality of encoded packets on the plurality of links according to the allocation scheme; and instructing to wirelessly transmit the plurality of encoded packets on the plurality of links.

Example 13 may include the non-transitory computer-readable medium of example 12, the operations further include determining a probability of a decoding failure event in which a subset of a minimum size of the plurality of encoded packets to recover the plurality of input packets is not received based on the probability of the transmission error and the probability of the link blockage error for each link of the plurality of links, wherein the allocation scheme is determined based on the probability of failing to receive the subset of the minimum size of the plurality of encoded packets to recover the plurality of input packets.

Example 14 may include the non-transitory computer-readable medium of example 13, wherein the probability of the decoding failure event is determined according to Equation 6.

Example 15 may include the non-transitory computer-readable medium of example 12, wherein the operation determining the allocation scheme for the plurality of encoded packets on the plurality of links includes: determining a function value of each link of the plurality of links according to Equation 7; identifying a function link of the plurality of links that corresponds to a minimum function value; allocating a k number of encoded packets on the function link, wherein k represents the subset of the minimum size of the plurality of encoded packets to recover the plurality of input packets; iteratively allocating an additional encoded packet of the plurality of encoded packets on each link of the plurality of links to obtain a plurality of adjusted allocation schemes, wherein the additional encoded packet includes an encoded packet within a difference between the plurality of encoded packets and the k number of encoded packets allocated on the function link; determining a difference value between each adjusted allocation scheme of the plurality of adjusted allocation schemes and a previous allocation scheme according to Equation 9; and identifying an adjusted allocation scheme of the plurality of adjusted allocation schemes that corresponds to a maximum difference value as a maximum allocation scheme, wherein the allocation scheme includes the k number of encoded packets allocated on the function link and the additional encoded packet allocated according to the maximum allocation scheme.

Example 16 may include the non-transitory computer-readable medium of example 15, wherein the additional encoded packet includes a first additional encoded packet, the plurality of adjusted allocation schemes include a first plurality of adjusted allocation schemes, the difference value includes a first difference value, the maximum allocation scheme includes a first maximum allocation scheme, and the operation determining the allocation scheme for the plurality of encoded packets on the plurality of links includes: iteratively allocating a second additional encoded packet of the plurality of encoded packets on each link of the plurality of links to obtain a second plurality of adjusted allocation schemes, wherein the second additional encoded packet includes an encoded packet within the difference between the plurality of encoded packets and the k number of encoded packets allocated on the function link; determining a second difference value between each adjusted allocation scheme of the second plurality of adjusted allocation schemes and the first maximum allocation scheme; and identifying an adjusted allocation scheme of the second plurality of adjusted allocation schemes that corresponds to a maximum difference value as a second maximum allocation scheme, wherein the allocation scheme further includes the second additional encoded packet allocated according to the second maximum allocation scheme.

Example 17 may include the non-transitory computer-readable medium of example 12, wherein the operation determining the allocation scheme for the plurality of encoded packets on the plurality of links includes: initializing a packet allocation according to a pre-defined allocation scheme; iteratively shifting allocation of a shift encoded packet of the plurality of encoded packets from an initial link on each different link of the plurality of links to obtain a plurality of adjusted allocation schemes; identifying an adjusted allocation scheme of the plurality of adjusted allocation schemes that corresponds to a minimal probability of a decoding failure event as a minimum allocation scheme; determining a descent difference value between the minimum allocation scheme and the pre-defined allocation scheme according to Equation 10; and responsive to the descent difference value being equal to or greater than a threshold value, identifying the minimum allocation scheme as the allocation scheme.

Example 18 may include the non-transitory computer-readable medium of example 17, wherein the shift encoded packet includes a first shift encoded packet, the plurality of adjusted allocation schemes include a first plurality of adjusted allocation schemes, the descent difference value includes a first descent difference value, the minimum allocation scheme includes a first minimum allocation scheme, and responsive to the first descent difference value being less than the threshold value, the operations further include: iteratively shifting allocation of a second shift encoded packet of the plurality of encoded packets from an initial link on each different link of the plurality of links to obtain a second plurality of adjusted allocation schemes; identifying an adjusted allocation scheme of the second plurality of adjusted allocation schemes that corresponds to a minimal probability of a decoding failure event as a second minimum allocation scheme; determining a second descent difference value between the second minimum allocation scheme and the first minimum allocation scheme; and responsive to the second descent difference value being equal to or greater than the threshold value, identifying the second minimum allocation scheme as the allocation scheme.

Example 19 may include the non-transitory computer-readable medium of example 17, wherein the pre-defined allocation scheme includes an equalized allocation scheme in which a difference between the number of encoded packets allocated on each link of the plurality of links is equal to or less than one.

Example 20 may include the non-transitory computer-readable medium of example 12, wherein the operation determining the allocation scheme for the plurality of encoded packets on the plurality of links includes: initializing a packet allocation according to a pre-defined allocation scheme; iteratively shifting allocation of a shift encoded packet of the plurality of encoded packets from an initial link on each different link of the plurality of links to obtain a plurality of adjusted allocation schemes; identifying an adjusted allocation scheme of the plurality of adjusted allocation schemes that corresponds to a minimal probability of a decoding failure event as a minimum allocation scheme; determining a descent difference value between the minimum allocation scheme and the pre-defined allocation scheme according to Equation 11; and responsive to the descent difference value being equal to or greater than a threshold value, identifying the minimum allocation scheme as the allocation scheme.

Example 21 may include the non-transitory computer-readable medium of example 20, wherein the operation determining $\Delta F_i(x_1, \ldots, x_i-1, \ldots, x_m; k)-\Delta F_j(x_1, \ldots, x_j-1, \ldots, x_m; k)$ is performed according to Equation 12.

Example 22 may include the non-transitory computer-readable medium of example 12, wherein the plurality of encoded packets represent delay sensitive data traffic including a latency setting equal to or less than ten milliseconds.

Example 23 may include a system, including: means to generate a plurality of encoded packets representative of a plurality of input packets; means to determine a probability of a transmission error for each link of a plurality of links; means to determine a probability of a link blockage error for each link of the plurality of links; means to determine an allocation scheme for the plurality of encoded packets on the plurality of links based on the probability of the transmission error and the probability of the link blockage error for each link of the plurality of links; means to allocate the plurality of encoded packets on the plurality of links according to the allocation scheme; and means to instruct to wirelessly transmit the plurality of encoded packets on the plurality of links.

Example 24 may include the system of example 23, further including means to determine a probability of a decoding failure event in which a subset of a minimum size of the plurality of encoded packets to recover the plurality of input packets is not received based on the probability of the transmission error and the probability of the link blockage error for each link of the plurality of links, wherein the allocation scheme is determined based on the probability of failing to receive the subset of the minimum size of the plurality of encoded packets to recover the plurality of input packets.

Example 25 may include the system of example 23, wherein the means to determine the allocation scheme for the plurality of encoded packets on the plurality of links include: means to determine a function value of each link of the plurality of links according to Equation 7; means to identify a function link of the plurality of links that corresponds to a minimum function value; means to allocate a k number of encoded packets on the function link, wherein k represents the subset of the minimum size of the plurality of encoded packets to recover the plurality of input packets; means to iteratively allocate an additional encoded packet of the plurality of encoded packets on each link of the plurality of links to obtain a plurality of adjusted allocation schemes, wherein the additional encoded packet includes an encoded packet within a difference between the plurality of encoded packets and the k number of encoded packets allocated on the function link; means to determine a difference value between each adjusted allocation scheme of the plurality of adjusted allocation schemes and a previous allocation scheme according to Equation 12; and means to identify an adjusted allocation scheme of the plurality of adjusted allocation schemes that corresponds to a maximum difference value as a maximum allocation scheme, wherein the allocation scheme includes the k number of encoded packets allocated on the function link and the additional encoded packet allocated according to the maximum allocation scheme.

Example 26 may include the system of example 25, wherein the additional encoded packet includes a first additional encoded packet, the plurality of adjusted allocation schemes include a first plurality of adjusted allocation schemes, the difference value includes a first difference value, the maximum allocation scheme includes a first maximum allocation scheme, and the means to determine the allocation scheme for the plurality of encoded packets on the plurality of links include: means to iteratively allocate a second additional encoded packet of the plurality of encoded packets on each link of the plurality of links to obtain a second plurality of adjusted allocation schemes, wherein the second additional encoded packet includes an encoded packet within the difference between the plurality of encoded packets and the k number of encoded packets allocated on the function link; means to determine a second difference value between each adjusted allocation scheme of the second plurality of adjusted allocation schemes and the first maximum allocation scheme; and means to identify an adjusted allocation scheme of the second plurality of adjusted allocation schemes that corresponds to a maximum difference value as a second maximum allocation scheme, wherein the allocation scheme further includes the second additional encoded packet allocated according to the second maximum allocation scheme.

Example 27 may include the system of example 23, wherein the means to determine the allocation scheme for the plurality of encoded packets on the plurality of links include: means to initialize a packet allocation according to a pre-defined allocation scheme; means to iteratively shift allocation of a shift encoded packet of the plurality of encoded packets from an initial link on each different link of the plurality of links to obtain a plurality of adjusted allocation schemes; means to identify an adjusted allocation scheme of the plurality of adjusted allocation schemes that corresponds to a minimal probability of a decoding failure event as a minimum allocation scheme; means to determine a descent difference value between the minimum allocation scheme and the pre-defined allocation scheme according to Equation 10; and responsive to the descent difference value being equal to or greater than a threshold value, means to identify the minimum allocation scheme as the allocation scheme.

Example 28 may include the system of example 27, wherein the shift encoded packet includes a first shift encoded packet, the plurality of adjusted allocation schemes include a first plurality of adjusted allocation schemes, the descent difference value includes a first descent difference value, the minimum allocation scheme includes a first minimum allocation scheme, and responsive to the first descent difference value being less than the threshold value, the system further includes: means to iteratively shift allocation of a second shift encoded packet of the plurality of encoded packets from an initial link on each different link of the plurality of links to obtain a second plurality of adjusted allocation schemes; means to identify an adjusted allocation scheme of the second plurality of adjusted allocation schemes that corresponds to a minimal probability of a decoding failure event as a second minimum allocation scheme; means to determine a second descent difference value between the second minimum allocation scheme and the first minimum allocation scheme; and responsive to the second descent difference value being equal to or greater than the threshold value, means to identify the second minimum allocation scheme as the allocation scheme.

Example 29 may include the system of example 23, wherein the means to determine the allocation scheme for the plurality of encoded packets on the plurality of links include: means to initialize a packet allocation according to a pre-defined allocation scheme; means to iteratively shift allocation of a shift encoded packet of the plurality of encoded packets from an initial link on each different link of the plurality of links to obtain a plurality of adjusted allocation schemes; means to identify an adjusted allocation scheme of the plurality of adjusted allocation schemes that corresponds to a minimal probability of a decoding failure event as a minimum allocation scheme; means to determine a descent difference value between the minimum allocation scheme and the pre-defined allocation scheme according to Equation 11; and responsive to the descent difference value being equal to or greater than a threshold value, means to identify the minimum allocation scheme as the allocation scheme.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to aspects containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although aspects of the present disclosure have been described in detail, various changes, substitutions, and alterations could be made hereto without departing from the spirit and scope of the present disclosure.

What is claimed is:

1. A system for wireless communication, the system comprising:
 a processor configured to:
  generate a plurality of encoded packets representative of a plurality of input packets;
  determine a probability of a transmission error for each link of a plurality of links;
  determine a probability of a link blockage error for each link of the plurality of links;
  determine an allocation scheme for the plurality of encoded packets on the plurality of links based on the probability of the transmission error and the probability of the link blockage error for each link of the plurality of links, wherein the allocation scheme comprises rules that define on which of the plurality of links each of the plurality of encoded packets is to be transmitted;
  allocate the plurality of encoded packets on the plurality of links according to the allocation scheme; and
  instruct to wirelessly transmit the plurality of encoded packets on the plurality of links.

2. The system of claim 1,
 wherein the processor is further configured to determine a probability of a decoding failure event in which a subset of a minimum size of the plurality of encoded packets to recover the plurality of input packets is not received based on the probability of the transmission error and the probability of the link blockage error for each link of the plurality of links, wherein the allocation scheme is determined based on the probability of failing to receive the subset of the minimum size of the plurality of encoded packets to recover the plurality of input packets.

3. The system of claim 2, wherein the probability of the decoding failure event is determined according to:

$$\sum_{i_1=0}^{x_1} \cdots \sum_{l_m=0}^{x_m} \prod_{i=1}^{m} \alpha_i^{1_{\{l_i < x_i\}}} (1-\alpha_i)^{l_i}$$

$$\left[\sum_{w_1=0}^{l_1} \cdots \sum_{w_m=0}^{l_m} 1_{\{\Sigma_{t=1}^{m} w_t < k\}} \prod_{j=1}^{m} \binom{l_j}{w_j} e_j^{l_j - w_j} (1-e_j)^{w_j}\right]$$

in which i represents a link index of a current link of the plurality of links for considering the probability of the link blockage error, m represents a total number of links of the plurality of links, x represents the number of encoded packets allocated on a corresponding current link of the plurality of links, α represents the probability of the link blockage error for the corresponding current link, e represents the probability of the transmission error for the corresponding current link, $1_{\{l_i < x_i\}}$ and $1_{\{\Sigma_{t=1}^{m} w_t < k\}}$ represent indicator functions of a corresponding condition, l represents a number of the plurality of encoded packets on the corresponding current link not affected by the link blockage error, w represents a number of the plurality of encoded packets on the corresponding current link that are further not affected by the transmission error, j represents a link index of a current link of the plurality of links for considering the probability of the transmission error, t represents a link index of a current link of the plurality of links for considering the corresponding indicator function, and k represents the minimum size of a subset of the plurality of encoded packets to recover the plurality of input packets.

4. The system of claim 1, wherein the processor is configured to determine the allocation scheme for the plurality of encoded packets on the plurality of links by:
   determining a function value of each link of the plurality of links according to:

$(1-\alpha_i)(1-e_i)$ in which i represents a link index of a current link of the plurality of links, a represents the probability of the link blockage error for a current link of the plurality of links, and e represents the probability of the transmission error for the current link;
   identifying a function link of the plurality of links that corresponds to a minimum function value;
   allocating a k number of encoded packets on the function link, wherein k represents the minimum size of a subset of the plurality of encoded packets to recover the plurality of input packets;
   iteratively allocating an additional encoded packet of the plurality of encoded packets on each link of the plurality of links to obtain a plurality of adjusted allocation schemes, wherein the additional encoded packet comprises an encoded packet within a difference between the plurality of encoded packets and the k number of encoded packets allocated on the function link;
   determining a difference value between each adjusted allocation scheme of the plurality of adjusted allocation schemes and a previous allocation scheme according to:

$$(1-\alpha_i)^{x_i+1} \cdot \sum_{\substack{(l_r, r \neq i) \\ 0 \leq l_r \leq x_r, \forall r \neq i}} \prod_{r \neq i} \alpha_r^{1_{\{l_r < x_r\}}} (1-\alpha_r)^{l_r} \cdot$$

-continued $$\left\{ \sum_{\substack{(w_j, j \neq i) \\ 0 \leq w_j \leq l_j, \forall j \neq i}} \left[\prod_{\substack{j \neq i \\ 1 \leq j \leq m}} \binom{l_j}{w_j} e_j^{l_j - w_j} (1-e_j)^{w_j}\right] \cdot \left(k - \sum_{\substack{t \neq i \\ 1 \leq t \leq m}} w_t - 1\right) \right.$$

$$\left. e_i^{x_i - k + \Sigma_{t \neq i} w_t + 1} (1-e_i)^{k - \Sigma_{t \neq i} w_t} \right\}$$

in which i represents a link index that the additional encoded packet is allocated on according to a corresponding adjusted allocation scheme of the plurality of adjusted allocation schemes, j and r represent link indices of current links, α represents the probability of the link blockage error for a corresponding current link of the plurality of links, e represents the probability of the transmission error for the corresponding current link, x represents a number of encoded packets allocated on the corresponding current links according to the previous allocation scheme, l represents a number of the plurality of encoded packets on the corresponding current links not affected by the link blockage error, w represents a number of the plurality of encoded packets on the corresponding current links that are further not affected the transmission error, t represents a link index for summing over the encoded packets associated with w, and k represents the minimum size of a subset of the plurality of encoded packets to recover the plurality of input packets; and
   identifying an adjusted allocation scheme of the plurality of adjusted allocation schemes that corresponds to a maximum difference value as a maximum allocation scheme, wherein the allocation scheme comprises the k number of encoded packets allocated on the function link and the additional encoded packet allocated according to the maximum allocation scheme.

5. The system of claim 4, wherein additional encoded packet comprises a first additional encoded packet, the plurality of adjusted allocation schemes comprise a first plurality of adjusted allocation schemes, the difference value comprises a first difference value, the maximum allocation scheme comprises a first maximum allocation scheme, and the processor is further configured to determine the allocation scheme for the plurality of encoded packets on the plurality of links by:
   iteratively allocating a second additional encoded packet of the plurality of encoded packets on each link of the plurality of links to obtain a second plurality of adjusted allocation schemes, wherein the second additional encoded packet comprises an encoded packet within the difference between the plurality of encoded packets and the k number of encoded packets allocated on the function link;
   determining a second difference value between each adjusted allocation scheme of the second plurality of adjusted allocation schemes and the first maximum allocation scheme; and
   identifying an adjusted allocation scheme of the second plurality of adjusted allocation schemes that corresponds to a maximum difference value as a second maximum allocation scheme, wherein the allocation scheme further comprises the second additional encoded packet allocated according to the second maximum allocation scheme.

6. The system of claim 1, wherein the processor is configured to determine the allocation scheme for the plurality of encoded packets on the plurality of links by:
   initializing a packet allocation according to a pre-defined allocation scheme;
   iteratively shifting allocation of a shift encoded packet of the plurality of encoded packets from an initial link on each different link of the plurality of links to obtain a plurality of adjusted allocation schemes;
   identifying an adjusted allocation scheme of the plurality of adjusted allocation schemes that corresponds to a minimal probability of a decoding failure event as a minimum allocation scheme;
   determining a descent difference value between the minimum allocation scheme and the pre-defined allocation scheme according to:

$$F(x_1', \ldots, x_m'; k) - F(x_1, \ldots, x_m; k)$$

in which x' represents a number of encoded packets allocated on a corresponding link of the plurality of links according to the minimum allocation scheme, k represents the minimum size of a subset of the plurality of encoded packets to recover the plurality of input packets, and x represents a number of encoded packets allocated on a corresponding link of the plurality of links according to the pre-identified allocation scheme; and
      responsive to the descent difference value being equal to or greater than a threshold value, identifying the minimum allocation scheme as the allocation scheme.

7. The system of claim 6, wherein the shift encoded packet comprises a first shift encoded packet, the plurality of adjusted allocation schemes comprise a first plurality of adjusted allocation schemes, the descent difference value comprises a first descent difference value, the minimum allocation scheme comprises a first minimum allocation scheme, and responsive to the first descent difference value being less than the threshold value, the processor is further configured to:
   iteratively shift allocation of a second shift encoded packet of the plurality of encoded packets from an initial link on each different link of the plurality of links to obtain a second plurality of adjusted allocation schemes;
   identify an adjusted allocation scheme of the second plurality of adjusted allocation schemes that corresponds to a minimal probability of a decoding failure event as a second minimum allocation scheme;
   determine a second descent difference value between the second minimum allocation scheme and the first minimum allocation scheme; and
   responsive to the second descent difference value being equal to or greater than the threshold value, identify the second minimum allocation scheme as the allocation scheme.

8. A non-transitory computer-readable medium comprising:
   a memory having computer-readable instructions stored thereon; and
   a processor operatively coupled to the memory and configured to read and execute the computer-readable instructions to perform or control performance of operations comprising:
      generating a plurality of encoded packets representative of a plurality of input packets;
      determining a probability of a transmission error for each link of a plurality of links;
      determining a probability of a link blockage error for each link of the plurality of links;
      determining an allocation scheme for the plurality of encoded packets on the plurality of links based on the probability of the transmission error and the probability of the link blockage error for each link of the plurality of links, wherein the allocation scheme comprises rules that define on which of the plurality of links each of the plurality of encoded packets is to be transmitted;
      allocating the plurality of encoded packets on the plurality of links according to the allocation scheme; and
      instructing to wirelessly transmit the plurality of encoded packets on the plurality of links.

9. The non-transitory computer-readable medium of claim 8, wherein the operation determining the allocation scheme for the plurality of encoded packets on the plurality of links comprises:
   determining a function value of each link of the plurality of links according to:

$$(1-\alpha_i)(1-e_i)$$

in which i represents a link index of a current link of the plurality of links, α represents the probability of the link blockage error for a current link of the plurality of links, and e represents the probability of the transmission error for the current link;
   identifying a function link of the plurality of links that corresponds to a minimum function value;
   allocating a k number of encoded packets on the function link, wherein k represents the minimum size of a subset of the plurality of encoded packets to recover the plurality of input packets;
   iteratively allocating an additional encoded packet of the plurality of encoded packets on each link of the plurality of links to obtain a plurality of adjusted allocation schemes, wherein the additional encoded packet comprises an encoded packet within a difference between the plurality of encoded packets and the k number of encoded packets allocated on the function link;
   determining a difference value between each adjusted allocation scheme of the plurality of adjusted allocation schemes and a previous allocation scheme according to:

$$(1-\alpha_i)^{x_i+1} \cdot \sum_{\substack{(l_r, r \neq i) \\ 0 \le l_r \le x_r, \forall r \neq i, 1 \le r \le m}} \prod_{r \neq i} \alpha_r^{1(l_r < x_r)} (1-\alpha_r)^{l_r} \cdot$$

$$\left\{ \sum_{\substack{(w_j, j \neq i) \\ 0 \le w_j \le l_j, \forall j \neq i}} \left[ \prod_{\substack{j \neq i \\ 1 \le j \le m}} \binom{l_j}{w_j} e_j^{l_j - w_j} (1-e_j)^{w_j} \right] \cdot \left( k - \sum_{\substack{t \neq i \\ 1 \le t \le m}} w_t - 1 \right) \right.$$

$$\left. e_i^{x_i - k + \sum_{t \neq i} w_t + 1} (1 - e_i)^{k - \sum_{t \neq i} w_t} \right\}$$

in which i represents a link index that the additional encoded packet is allocated on according to a corresponding adjusted allocation scheme of the plurality of adjusted allocation schemes, j and r represent link indices of current links, a represents the probability of the link blockage error for a corresponding current link of the plurality of links, e represents the probability of the transmission error for the corresponding current link, x represents a number of encoded packets allocated on the corresponding current links according to the previous allocation scheme, l represents a number of the plurality of encoded packets on the corresponding current links not affected by the link blockage error, w represents a number of the plurality of encoded packets on the corresponding current links that are further not affected by the transmission error, t represents a link index for summing over the encoded packets associated with w, and k represents the minimum size of a subset of the plurality of encoded packets to recover the plurality of input packets; and identifying an adjusted allocation scheme of the plurality of adjusted allocation schemes that corresponds to a maximum difference value as a maximum allocation scheme, wherein the allocation scheme comprises the k number of encoded packets allocated on the function link and the additional encoded packet allocated according to the maximum allocation scheme.

10. The non-transitory computer-readable medium of claim 9, wherein the additional encoded packet comprises a first additional encoded packet, the plurality of adjusted allocation schemes comprise a first plurality of adjusted allocation schemes, the difference value comprises a first difference value, the maximum allocation scheme comprises a first maximum allocation scheme, and the operation determining the allocation scheme for the plurality of encoded packets on the plurality of links comprises:

iteratively allocating a second additional encoded packet of the plurality of encoded packets on each link of the plurality of links to obtain a second plurality of adjusted allocation schemes, wherein the second additional encoded packet comprises an encoded packet within the difference between the plurality of encoded packets and the k number of encoded packets allocated on the function link;

determining a second difference value between each adjusted allocation scheme of the second plurality of adjusted allocation schemes and the first maximum allocation scheme; and identifying an adjusted allocation scheme of the second plurality of adjusted allocation schemes that corresponds to a maximum difference value as a second maximum allocation scheme, wherein the allocation scheme further comprises the second additional encoded packet allocated according to the second maximum allocation scheme.

11. The non-transitory computer-readable medium of claim 8, wherein the operation determining the allocation scheme for the plurality of encoded packets on the plurality of links comprises:

initializing a packet allocation according to a pre-defined allocation scheme;

iteratively shifting allocation of a shift encoded packet of the plurality of encoded packets from an initial link on each different link of the plurality of links to obtain a plurality of adjusted allocation schemes;

identifying an adjusted allocation scheme of the plurality of adjusted allocation schemes that corresponds to a minimal probability of a decoding failure event as a minimum allocation scheme;

determining a descent difference value between the minimum allocation scheme and the pre-defined allocation scheme according to:

$$F(x_1', \ldots, x_m'; k) - F(x_1, \ldots, x_m; k)$$

in which x' represents a number of encoded packets allocated on a corresponding link of the plurality of links according to the minimum allocation scheme, k represents the minimum size of a subset of the plurality of encoded packets to recover the plurality of input packets, and x represents a number of encoded packets allocated on a corresponding link of the plurality of links according to the pre-identified allocation scheme; and responsive to the descent difference value being equal to or greater than a threshold value, identifying the minimum allocation scheme as the allocation scheme.

12. The non-transitory computer-readable medium of claim 11, wherein the shift encoded packet comprises a first shift encoded packet, the plurality of adjusted allocation schemes comprise a first plurality of adjusted allocation schemes, the descent difference value comprises a first descent difference value, the minimum allocation scheme comprises a first minimum allocation scheme, and responsive to the first descent difference value being less than the threshold value, the operations further comprise:

iteratively shifting allocation of a second shift encoded packet of the plurality of encoded packets from an initial link on each different link of the plurality of links to obtain a second plurality of adjusted allocation schemes;

identifying an adjusted allocation scheme of the second plurality of adjusted allocation schemes that corresponds to a minimal probability of a decoding failure event as a second minimum allocation scheme;

determining a second descent difference value between the second minimum allocation scheme and the first minimum allocation scheme; and responsive to the second descent difference value being equal to or greater than the threshold value, identifying the second minimum allocation scheme as the allocation scheme.

13. The non-transitory computer-readable medium of claim 8, wherein the operation determining the allocation scheme for the plurality of encoded packets on the plurality of links comprises:

initializing a packet allocation according to a pre-defined allocation scheme;

iteratively shifting allocation of a shift encoded packet of the plurality of encoded packets from an initial link on each different link of the plurality of links to obtain a plurality of adjusted allocation schemes;

identifying an adjusted allocation scheme of the plurality of adjusted allocation schemes that corresponds to a minimal probability of a decoding failure event as a minimum allocation scheme;

determining a descent difference value between the minimum allocation scheme and the pre-defined allocation scheme according to:

$$\Delta F_i(x_1, \ldots, x_i-1, \ldots, x_m; k) - \Delta F_j(x_1, \ldots, x_j-1, \ldots, x_m; k)$$

in which i represents a link index of a current link of the plurality of links according to the pre-defined allocation scheme, j represents a link index of a current link of the plurality of links according to the minimum allocation scheme, m represents a total number of links of the plurality of links, x represents a number of encoded packets allocated on a corresponding current link of the plurality of links according to the pre-defined allocation scheme, and k represents the minimum size of a subset of the plurality of encoded packets to recover the plurality of input packets; and responsive to the descent difference value being equal to or greater than a threshold value, identifying the minimum allocation scheme as the allocation scheme.

14. The non-transitory computer-readable medium of claim 13, wherein the operation determining $\Delta F_i(x_1, \ldots, x_i-1, \ldots, x_m; k) - \Delta F_j(x_1, \ldots, x_j-1, \ldots, x_m; k)$ is performed according to:

$$\Delta F_i(x_1, \ldots, x_m; k) =$$

$$(1-\alpha_i)^{x_i+1} \cdot \sum_{\substack{(l_r, r \neq i) \\ 0 \leq l_r \leq x_r, \forall r \neq i}} \prod_{r \neq i} \alpha_r^{1_{(l_r < x_r)}} (1-\alpha_r)^{l_r} \cdot \left\{ \sum_{\substack{(w_j, j \neq i) \\ 0 \leq w_j \leq l_j, \forall j \neq i}} \left[ \prod_{\substack{j \neq i \\ 1 \leq j \leq m}} \binom{l_j}{w_j} e_j^{l_j - w_j} (1-e_j)^{w_j} \right] \cdot \left( k - \sum_{\substack{t \neq i \\ 1 \leq t \leq m}} w_t - 1 \right) e_i^{x_i - k + \Sigma_{t \neq i} w_t + 1} (1-e_i)^{k - \Sigma_{t \neq i} w_t} \right\}$$

in which α represents the probability of the link blockage error for a corresponding current link of the plurality of links, e represents the probability of the transmission error for a corresponding current link of the plurality of links, l represents a number of the plurality of encoded packets on the corresponding current link not affected by the link blockage error, w represents a number of the plurality of encoded packets on the corresponding current link that are further not affected by the transmission error, and k represents the minimum size of a subset of the plurality of encoded packets to recover the plurality of input packets.

15. A system, comprising:
means to generate a plurality of encoded packets representative of a plurality of input packets;
means to determine a probability of a transmission error for each link of a plurality of links;
means to determine a probability of a link blockage error for each link of the plurality of links;
means to determine an allocation scheme for the plurality of encoded packets on the plurality of links based on the probability of the transmission error and the probability of the link blockage error for each link of the plurality of links, wherein the allocation scheme comprises rules that define on which of the plurality of links each of the plurality of encoded packets is to be transmitted;
means to allocate the plurality of encoded packets on the plurality of links according to the allocation scheme; and
means to instruct to wirelessly transmit the plurality of encoded packets on the plurality of links.

16. The system of claim 15, further comprising means to determine a probability of a decoding failure event in which a subset of a minimum size of the plurality of encoded packets to recover the plurality of input packets is not received based on the probability of the transmission error and the probability of the link blockage error for each link of the plurality of links, wherein the allocation scheme is determined based on the probability of failing to receive the subset of the minimum size of the plurality of encoded packets to recover the plurality of input packets.

17. The system of claim 15, wherein the means to determine the allocation scheme for the plurality of encoded packets on the plurality of links comprise:
means to determine a function value of each link of the plurality of links according to:

$$(1-\alpha_i)(1-e_i)$$

in which i represents a link index of a current link of the plurality of links, a represents the probability of the link blockage error for a current link of the plurality of links, and e represents the probability of the transmission error for the current link;

means to identify a function link of the plurality of links that corresponds to a minimum function value;
means to allocate a k number of encoded packets on the function link, wherein k represents the minimum size of a subset of the plurality of encoded packets to recover the plurality of input packets;
means to iteratively allocate an additional encoded packet of the plurality of encoded packets on each link of the plurality of links to obtain a plurality of adjusted allocation schemes, wherein the additional encoded packet comprises an encoded packet within a difference between the plurality of encoded packets and the k number of encoded packets allocated on the function link;
means to determine a difference value between each adjusted allocation scheme of the plurality of adjusted allocation schemes and a previous allocation scheme according to:

$$(1-\alpha_i)^{x_i+1} \cdot \sum_{\substack{(l_r, r \neq i) \\ 0 \leq l_r \leq x_r, \forall r \neq i}} \prod_{\substack{r \neq i \\ 1 \leq r \leq m}} \alpha_r^{1_{(l_r < x_r)}} (1-\alpha_r)^{l_r} \cdot$$

$$\left\{ \sum_{\substack{(w_j, j \neq i) \\ 0 \leq w_j \leq l_j, \forall j \neq i}} \left[ \prod_{\substack{j \neq i \\ 1 \leq j \leq m}} \binom{l_j}{w_j} e_j^{l_j - w_j} (1-e_j)^{w_j} \right] \cdot \left( k - \sum_{\substack{t \neq i \\ 1 \leq t \leq m}} w_t - 1 \right) \right.$$

$$\left. e_i^{x_i - k + \Sigma_{t \neq i} w_t + 1} (1-e_i)^{k - \Sigma_{t \neq i} w_t} \right\}$$

in which i represents a link index that the additional encoded packet is allocated on according to a corresponding adjusted allocation scheme of the plurality of adjusted allocation schemes, j and r represent link indices of current links, a represents the probability of the link blockage error for a corresponding current link of the plurality of links, e represents the probability of the transmission error for the corresponding current link, x represents a number of encoded packets allocated on the corresponding current links according to the previous allocation scheme, l represents a number of the plurality of encoded packets on the corresponding current links not affected by the link blockage error, w represents a number of the plurality of encoded packets on the corresponding current links that are further not affected by the transmission error, t represents a link index for summing over the encoded packets associated with w, and k represents the minimum size of a subset of the plurality of encoded packets to recover the plurality of input packets; and means to identify an adjusted allocation scheme of the plurality of adjusted allocation schemes that corresponds to a maximum difference value as a maximum allocation scheme, wherein the allocation scheme comprises the k number of encoded packets allocated on the function link and the additional encoded packet allocated according to the maximum allocation scheme.

18. The system of claim 17, wherein the additional encoded packet comprises a first additional encoded packet, the plurality of adjusted allocation schemes comprise a first plurality of adjusted allocation schemes, the difference value comprises a first difference value, the maximum allocation scheme comprises a first maximum allocation scheme, and the means to determine the allocation scheme for the plurality of encoded packets on the plurality of links comprise:

means to iteratively allocate a second additional encoded packet of the plurality of encoded packets on each link of the plurality of links to obtain a second plurality of adjusted allocation schemes, wherein the second additional encoded packet comprises an encoded packet within the difference between the plurality of encoded packets and the k number of encoded packets allocated on the function link;

means to determine a second difference value between each adjusted allocation scheme of the second plurality of adjusted allocation schemes and the first maximum allocation scheme; and means to identify an adjusted allocation scheme of the second plurality of adjusted allocation schemes that corresponds to a maximum difference value as a second maximum allocation scheme, wherein the allocation scheme further comprises the second additional encoded packet allocated according to the second maximum allocation scheme.

19. The system of claim 15, wherein the means to determine the allocation scheme for the plurality of encoded packets on the plurality of links comprise:

means to initialize a packet allocation according to a pre-defined allocation scheme;

means to iteratively shift allocation of a shift encoded packet of the plurality of encoded packets from an initial link on each different link of the plurality of links to obtain a plurality of adjusted allocation schemes;

means to identify an adjusted allocation scheme of the plurality of adjusted allocation schemes that corresponds to a minimal probability of a decoding failure event as a minimum allocation scheme;

means to determine a descent difference value between the minimum allocation scheme and the pre-defined allocation scheme according to:

$$F(x_1', \ldots, x_m'; k) - F(x_1, \ldots, x_m; k)$$

in which x' represents a number of encoded packets allocated on a corresponding link of the plurality of links according to the minimum allocation scheme, k represents the minimum size of a subset of the plurality of encoded packets to recover the plurality of input packets, and x represents a number of encoded packets allocated on a corresponding link of the plurality of links according to the pre-identified allocation scheme; and responsive to the descent difference value being equal to or greater than a threshold value, means to identify the minimum allocation scheme as the allocation scheme.

20. The system of claim 19, wherein the shift encoded packet comprises a first shift encoded packet, the plurality of adjusted allocation schemes comprise a first plurality of adjusted allocation schemes, the descent difference value comprises a first descent difference value, the minimum allocation scheme comprises a first minimum allocation scheme, and responsive to the first descent difference value being less than the threshold value, the system further comprises:

means to iteratively shift allocation of a second shift encoded packet of the plurality of encoded packets from an initial link on each different link of the plurality of links to obtain a second plurality of adjusted allocation schemes;

means to identify an adjusted allocation scheme of the second plurality of adjusted allocation schemes that corresponds to a minimal probability of a decoding failure event as a second minimum allocation scheme;

means to determine a second descent difference value between the second minimum allocation scheme and the first minimum allocation scheme; and responsive to the second descent difference value being equal to or greater than the threshold value, means to identify the second minimum allocation scheme as the allocation scheme.

* * * * *